(12) United States Patent
Mamidi et al.

(10) Patent No.: US 8,732,217 B2
(45) Date of Patent: *May 20, 2014

(54) USING A PER FILE ACTIVITY RATIO TO OPTIMALLY RELOCATE DATA BETWEEN VOLUMES

(75) Inventors: Murthy V. Mamidi, San Jose, CA (US); Kadir Ozdemir, San Jose, CA (US); Charles Silvers, Santa Clara, CA (US); Paul Massiglia, Colorado Springs, CO (US); Anindya Banerjee, Pune (IN); Ronald Karr, Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 518 days.

This patent is subject to a terminal disclaimer.

(21) Appl. No.: 12/610,175

(22) Filed: Oct. 30, 2009

(65) Prior Publication Data

US 2011/0106863 A1 May 5, 2011

(51) Int. Cl.
*G06F 7/76* (2006.01)
*G06F 12/02* (2006.01)

(52) U.S. Cl.
USPC .......................................... 707/821; 711/100

(58) Field of Classification Search
None
See application file for complete search history.

(56) References Cited

U.S. PATENT DOCUMENTS

| | | | |
|---|---|---|---|
| 7,660,790 B1* | 2/2010 | Batterywala et al. | 707/999.005 |
| 2006/0085852 A1* | 4/2006 | Sima | 726/22 |
| 2006/0136903 A1* | 6/2006 | Childress et al. | 717/172 |
| 2008/0028164 A1* | 1/2008 | Ikemoto et al. | 711/154 |
| 2008/0288714 A1* | 11/2008 | Salomon et al. | 711/103 |

* cited by examiner

*Primary Examiner* — Ajay Bhatia
*Assistant Examiner* — Miranda Huang
(74) *Attorney, Agent, or Firm* — Wilmer Cutler Pickering Hale and Dorr LLP

(57) ABSTRACT

A method for identifying data for relocation in a multivolume file system. The method includes generating a file location map, the file location map containing a list of the locations of files that occupy space on each of a plurality of volumes of the file system, wherein The file system comprising least a first volume and a second volume. The method further includes updating the file location map in accordance with changes in a file change log for the file system, and identifying data residing on the first volume of the file system by scanning the file location map. Using the identified data, a ratio of per-file activity during a first time period relative to overall file system activity over a second time period is calculated to derive a file activity ratio for each of the files of the identified data. Files are then selected for relocation based on the file activity ratio.

19 Claims, 20 Drawing Sheets

USING A PER FILE ACTIVITY RATIO TO OPTIMALLY RELOCATE DATA BETWEEN VOLUMES

CROSS REFERENCE TO RELATED APPLICATION

This application is related to the U.S. patent application "A METHOD FOR QUICKLY IDENTIFYING DATA RESIDING ON A VOLUME IN A MULTIVOLUME FILE SYSTEM", by Mamidi et al., filed on Oct. 30, 2009, Ser. No. 12/610,153, which is incorporated by reference in its entirety.

FIELD OF THE INVENTION

The present invention is generally related to digital computer systems.

BACKGROUND OF THE INVENTION

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

A multivolume file system (e.g., such as the VERITAS file system VxFS) can distribute a single file system name space across multiple VxVM virtual volumes. Using the Dynamic Storage Tiering (DST) feature of the file system, subsets of these volumes can be organized into administrator-defined storage tiers. Administrators can define policies that cause the file system to place classes of files on specific storage tiers when they are created, and relocated between tiers when their states change in certain ways. For example, files can be relocated when they have been inactive for a specified period, or when I/O activity against them has exceeded or dropped below a threshold. DST determines when to relocate files by periodically scanning a file system's entire directory structure or inode list and evaluating each file against the relocation policy rules in effect at the time of the scan. This works well with disk-based storage tiers, where the differences in performance and cost between tiers is relatively narrow (2-4x), and the scan frequency is relatively low (daily or less frequently). But as the number of files in a file system grows into the millions, the I/O and processing overhead of scanning begins to have a noticeable effect on operations, and is best done in off-peak periods.

Recently, the rapid rise in popularity of solid-state disks (SSDs) has changed the enterprise storage landscape. SSDs outperform rotating disks by a wide margin, but their cost per byte is roughly an order of magnitude higher. Moreover, the endurance of the current generation of SSDs is limited, wherein after a number of writes, flash memory cells begin to fail. These three factors make it doubly important to place the "right" type of files (very active; read-dominated) on SSDs, and to move them off to other storage media quickly when they are no longer active. From a DST standpoint, this might mean multiple relocation scans per day. In file systems containing large numbers of files, multiple scans per day is likely to be impractical from a resource consumption standpoint. These two factors, file systems containing large numbers of files and the need to optimize SSD utilization, provide strong motivation to search for an alternative to periodic relocation based on full file system scans.

SUMMARY OF THE INVENTION

Thus, the problem solved by this invention has three interrelated facets: (a) the difficulty of specifying appropriate I/O activity thresholds as relocation criteria (applicable to both rotating and SSD storage), (b) the need to reduce the impact of relocation scans on production activity, and (c) the necessity of choosing the "right" files to utilize limited SSD resources effectively. Embodiments of the present invention provide an elegant solution to this problem.

In one embodiment, the present invention is implemented as a method for identifying data for relocation in a multivolume file system. The method includes generating a file location map, the file location map containing a list of the locations of files that occupy space on each of a plurality of volumes of the file system, wherein the file system comprising least a first volume and a second volume. The method further includes updating the file location map in accordance with changes in a file change log for the file system, and identifying data residing on the first volume of the file system by scanning the file location map. Using the identified data, a ratio of per-file activity during a first time period relative to overall file system activity over a second time period is calculated to derive a file activity ratio for each of the files of the identified data. Files are then selected for relocation based on the file activity ratio.

In one embodiment, the file change log is scanned in a sampling interval to identify files active during the sampling interval. The file change log can be scanned to identify the files active during the sampling interval in response to a received user command. Alternatively, the file change log can be scanned to identify the files active during the sampling interval in response to a predetermined schedule.

In one embodiment, the file change log is scanned to determine which files are active during the sampling interval, wherein the file location map is used to determine which files are located on a volume of interest independent of activity against said which files. Files of the identified data having a file activity ratio below a low threshold can be relocated from the first volume to the second volume, and files of the identified data having a file activity ratio above a high threshold can be relocated from the second volume to the first volume. The first volume is typically of a higher performance tier than the second volume.

In one embodiment, the first volume comprises SSD (solid-state disk) based storage and the second volume comprises rotating disk media based storage. Files of the identified data having write activity above a high write activity threshold can be relocated from the first volume to the second volume.

In one embodiment, the file change log is scanned to determine which files are active during the sampling interval without scanning file system metadata in substantially its entirety.

In one embodiment, files of the identified data having random read activity above a high write activity threshold are relocated from the second volume to the first volume.

In one embodiment, the present invention is implemented as a computer readable storage medium having stored thereon, computer executable instructions that, if executed by a computer system cause the computer system to perform a method comprising, generating a file location map, the file location map containing a list of the locations of files that occupy space on each of a plurality of volumes of the file system, the file system comprising least a first volume and a second volume, wherein the first volume is of a higher performance tier than the second volume. The method further includes updating the file location map in accordance with changes in a file change log for the file system, and identifying data residing on the first volume of the file system by scanning the file location map. The method further includes using the identified data, calculating a ratio of per-file activity during a first time period relative to overall file system activity over a second time period to derive a file activity ratio for each of the files of the identified data, wherein the file change log is scanned in a sampling interval to identify files active during the sampling interval. Files are then selected for relocation based on the file activity ratio.

In yet another embodiment, the present invention is implemented as a multivolume file system. The multivolume file system comprises a computer system having a processor coupled to a computer readable storage media and executing computer readable code which causes the computer system to generate a file location map, the file location map containing a list of the locations of files that occupy space on each of a plurality of volumes of the file system, the file system comprising least a first volume and a second volume, wherein the first volume is of a higher performance tier than the second volume. The computer system updates the file location map in accordance with changes in a file change log for the file system, and identifies data residing on the first volume of the file system by scanning the file location map. Using the identified data, the computer system further calculates a ratio of per-file activity during a first time period relative to overall file system activity over a second time period to derive a file activity ratio for each of the files of the identified data, wherein the file change log is scanned in a sampling interval to identify files active during the sampling interval. The computer system selects files for relocation based on the file activity ratio.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
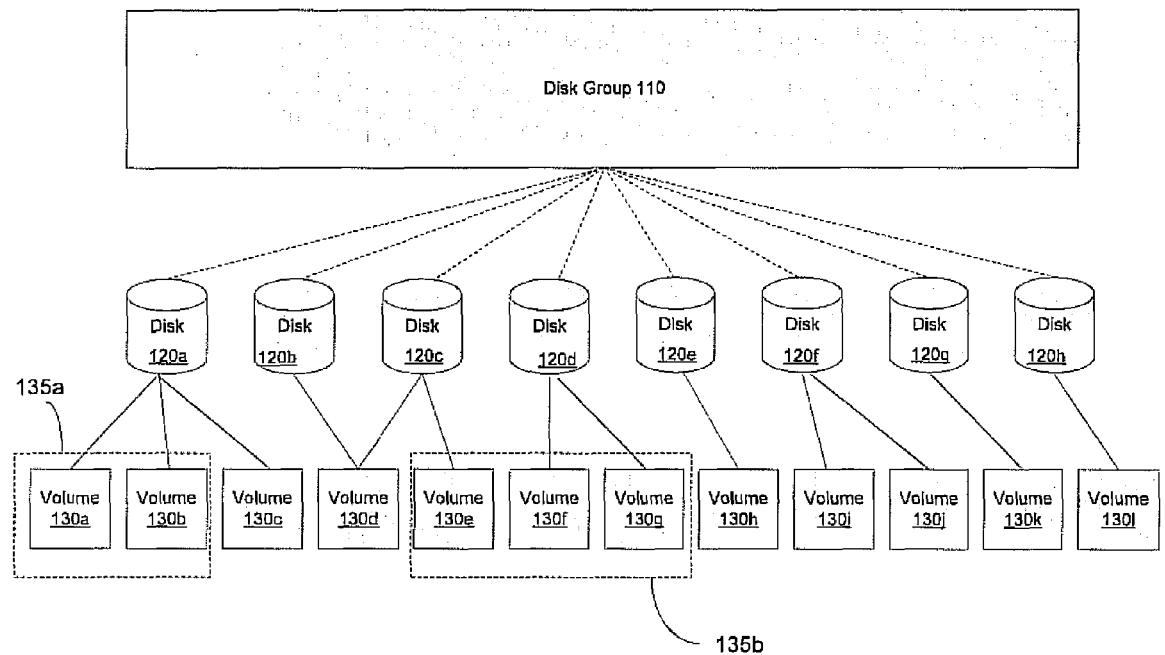
FIG. 1 is a block diagram illustrating an exemplary storage hierarchy according to one embodiment.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "relocating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention enable the effective use of SSDs in multi-tier file systems. Embodiments of the present invention employ methods for quickly identifying files on a particular volume of a multi-volume file system so that they can be relocated. In one embodiment, the present invention implements a map that associates storage devices with the inodes of files residing on them. In such an embodiment, the map is updated based on file creations and deletions recorded in the file system's File Change Log (FCL), and relocations done during Dynamic Storage Tiering policy enforcement, thereby reducing the impact of relocation scans on production activity, and automatically chooses the "right" files to utilize limited tier 1 volumes (e.g., SSD resources) effectively. Additionally, embodiments of the present invention can optimally specify appropriate I/O activity thresholds as relocation criteria (applicable to both rotating and SSD storage).

In this manner, attributes of embodiments of the present invention are able to scale with the increasing sizes of file systems. For example, as the number of files in a file system grows into the millions, one embodiment of the present invention can efficiently place the "right" type of files (e.g., very active; read-dominated) on high-performance/high-value SSDs, and to move them off to other storage media quickly when they are no longer active. Additionally, this capability is provided without impacting the system with an inordinate amount of file scanning overhead. This capability enables a data center to optimally configure and deploy relatively small amounts of high-performance, expensive SSD storage and large amounts of less expensive bulk storage by quickly determining which files occupy space on an expensive storage tier so that a software-based process (e.g., a DST engine policy enforcer) can make decisions about relocating them. An exemplary storage system as depicted in FIG. 1 is now described.

FIG. 1 is a block diagram illustrating an exemplary storage hierarchy 101 according to one embodiment. Storage hierarchy 101 includes a disk group 110, disks 120a-120h, and volumes 130a-130l. A disk group 110 may be a named collection of disks 120 managed as a group. Disk group 110 may contain disks 120a-120h (collectively, disks 120), and each disk 120 may contain part or all of a logical volume 130 (e.g., logical volumes 130a-l, which may also be termed volumes 130). For example, disk 120a may contain volume 130a-c, disk 120c may contain volume 130e, disk 120d may contain volumes 130f and 130g, etc. Volume 130d may span two disks, 120b and 120c; that is, only part of volume 130d may be contained within a single disk 120b or 120c. In one embodiment, a disk array device may also be represented as a single object within storage hierarchy 101, e.g., simply as a larger disk 120; while in other embodiments, each disk of a disk array may be represented as a separate storage device.

A file system may be contained within a given one or more volumes 130, while some volumes may not contain any file system. In some embodiments, a collection of volumes (such as volumes 130a and 130b) may be designated and referred to collectively as a named volume set, for example for administrative purposes. In the FIG. 1 example, volumes 130a and 130b are contained in volume set 135a, while volumes 130e, 130f and 130g are contained in volume set 135b. It is noted that in certain embodiments, a volume set may be restricted to contain a single file system.

Storage hierarchy 101 may represent the organization of storage of a given storage client or clients running one or more applications. For example, in one embodiment storage hierarchy 101 may represent the storage organization for a database application, where one subset of volumes 130 and file systems 140 may be used for a collection of database tables, a second subset for database indexes, a third for database recovery logs, etc.

For a variety of reasons, it may be desirable to save a representation of storage hierarchy 101 and to recreate the logical organization represented by storage hierarchy 101 by mapping the virtual storage devices such as volumes 130 and file systems 140 at a target set of physical storage devices (i.e., disks and/or disk groups). Storage hierarchy 101 may be referred to as a source storage hierarchy for the mapping. The target set of physical storage devices may consist of the same physical storage devices (e.g., disks 120 of disk group 110) that were used in the source storage hierarchy 101, or of different physical storage devices. For example, in one embodiment, the representation of storage hierarchy 101 may be saved as part of, or along with, a data backup operation for the storage client, and the logical organization may be recreated as part of a system restore operation using the same or different storage hardware. In another embodiment, the representation of logical hierarchy 101 may be saved and restored by a frozen image server or other provider of point-in-time copies of application data using different physical storage devices, or by a tool supporting migration or remote replication of application data, also using different physical storage devices. Various other tools and/or service providers may also utilize a saved representation of storage hierarchy 101 in order to recreate the logical relationships of file systems, volumes and physical storage devices depicted in FIG. 1.

Figure 2:
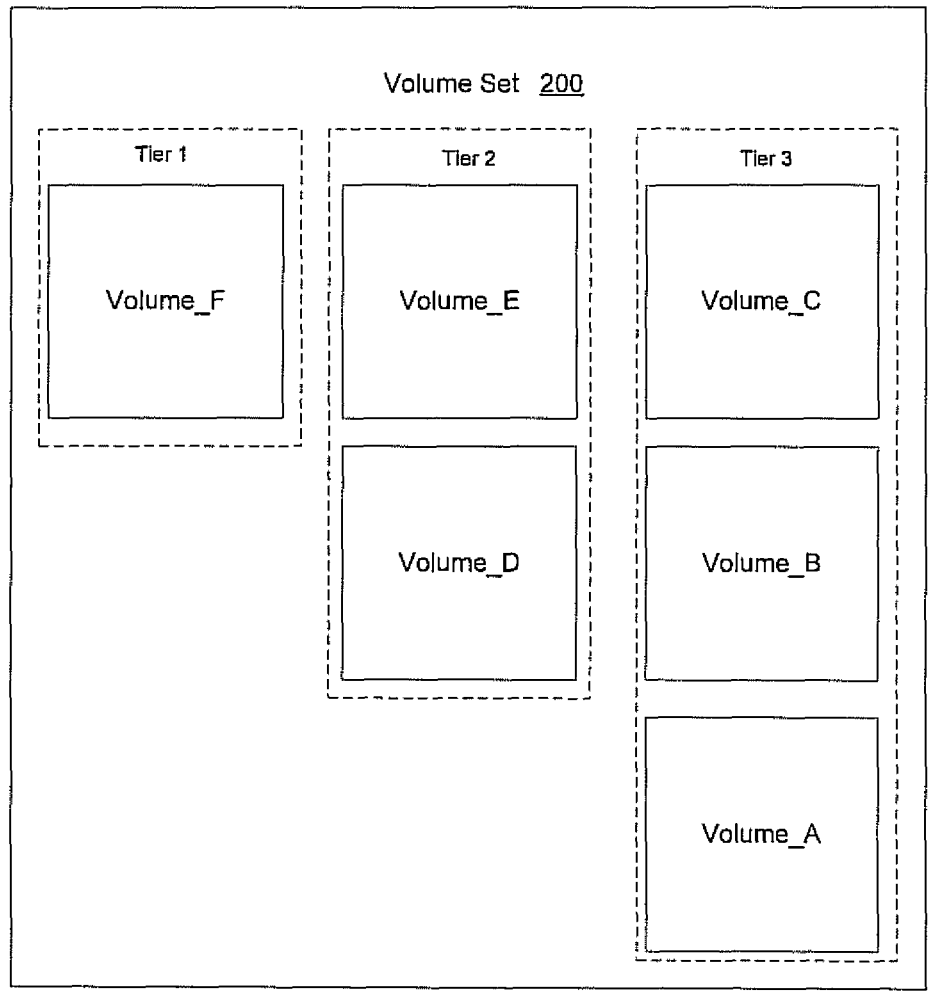
FIG. 2 shows a diagram of an exemplary volume set in accordance with one embodiment of the present invention.

FIG. 2 shows a diagram of an exemplary volume set 200 in accordance with one embodiment of the present invention. As depicted in FIG. 2, the volume set 200 includes six volumes, shown as Volume_A through Volume_F.

The FIG. 2 embodiment shows an example of a multi-volume volume set (e.g., volume set 200). A DST engine is typically configured to operate upon a multi-volume set. The DST engine has several advanced features that increase its utility and applicability. These unique features and their implications on multi-volume file system and DST behavior are now described.

One objective of the DST engine is a reduction in average storage hardware cost without an offsetting increase in administrative complexity. In most instances, the reduction in hardware cost stems from placing files on storage devices commensurate with their business value. Critical files are placed on highly available, high-performance (and therefore expensive) storage devices, while less critical files are placed on lower cost devices with lesser performance and availability specifications. The more non-critical data an enterprise must keep online, the greater the fraction of its online storage that can be purchased and configured to keep cost low.

Fundamentally, enterprises organize their digital information as hierarchies (directories) of files. Files are usually closely associated with business purpose, e.g., documents, tables of transaction records, images, audio tracks, and other digital business objects are all conveniently represented as files, each with a business value. Files are therefore obvious objects around which to optimize storage and I/O cost and performance.

The key to deriving value from multiple tiers of storage is to place each file on the appropriate type of storage device. More critical files should be placed on higher-performing, more reliable (and therefore more expensive) devices; less critical files can be placed on less costly ones. The problem of matching a file to the 'right' types of storage device is not technically challenging. Administrators can cause files to be created on the right type of storage, for example by assigning users or applications to specific devices. The challenge lies in the numbers, however. Getting millions of files placed on the right devices is far too time-consuming to do effectively without some form of automation.

Moreover, the right type of storage for a file changes over time. As a file ages, is accessed more or less frequently, grows or shrinks, or moves around within its file system logical name space, the right type of storage device changes. Using a conventional technique, such as, for example, manually relocating millions of files between tiers of storage devices would be a never-ending task.

As described above, the conventional strategy for utilizing multi-tier storage is to create separate file systems for each type of storage in the data center, and to copy files from one to another as business needs change. For example, files containing database tables of transactions can be moved to lower cost storage devices as the transactions age, because aged transactions are backed up, and applications and users access them infrequently if at all. But as a data center grows, the number of file systems and administrative operations required to implement strategies of this sort becomes unwieldy. Each change in the way data is stored and organized must be accompanied by corresponding changes in application configurations and operating procedures.

Hence, automation is a necessity for utilizing multiple tiers of storage effectively, and the more files an enterprise has, the more of a necessity it becomes. In one embodiment, the DST engine automates the relocation of files to the right types of storage devices without changing their logical locations in the file system name space. Because physically relocated files remain at the same logical locations, the DST engine eliminates the need for changes in applications and operating procedures. To applications and users, DST file relocation is transparent. In this manner, the DST engine can automatically and transparently implement multi-tier storage through the use of virtual or physical storage devices with different I/O performance, data availability, and relative cost characteristics to provide differentiated online storage for computer systems.

Referring again to FIG. 2, it can be seen that the volume set 200 comprises a file system construct whose logical name space is distributed across the multiple volumes, Volume_A through Volume_F. The volumes on which a file system is constructed are known as its volume set. The volumes in a volume set are configured from disks or disk array LUNs that belong to a single disk group. Volumes may be of different types (for example, striped, RAID-5, mirrored, and so forth) and may be based on different hardware technologies such as Fibre Channel disk array LUNs, SATA disk array LUNs, parallel SCSI JBOD, and so forth. The attribute that a multi-volume file system occupies multiple volumes is transparent to applications. Typically, all files in the file system are part of the same name space and are accessed and manipulated as though they all occupied a single volume.

The FIG. 2 diagram also shows the six volumes Volume_A through Volume_F belonging to three different tiers, tier 1, tier 2 and tier 3. In one embodiment, the tier 1 volume (e.g., Volume_F) comprises a high-performance/high cost storage unit (e.g., one or more SSD systems), the tier 2 volumes (e.g., Volume_E and Volume_D) comprise medium performance/medium cost storage units (e.g., a SAN system) and the tier 3 volumes (e.g., Volume_C, Volume_B and Volume_A) comprise low performance/low-cost storage units (a JBOD system). Such a volume set might be suitable for a file system containing a few critical files (tier1), a larger number of files of average importance (tier2), and a still larger number of comparatively inactive files (tier3).

Figure 3:
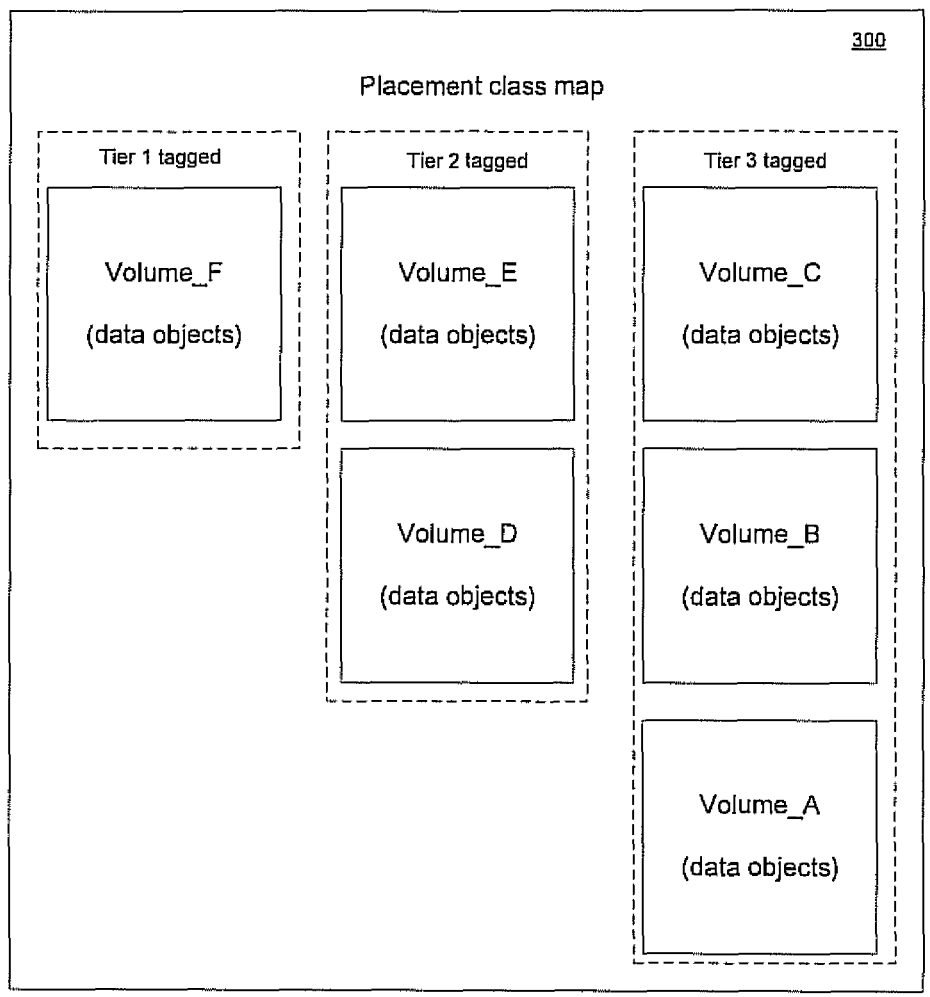
FIG. 3 shows a diagram depicting a placement map showing tagged data objects in accordance with one embodiment of the present invention.

FIG. 3 shows a diagram depicting a placement map showing tagged data objects in accordance with one embodiment of the present invention. In one embodiment, an administrator assigns file system volumes to placement classes by associating character strings called volume tags with them. In FIG. 3, Volume_F is tagged tier1, Volume_D and Volume_E are tagged tier2, and Volume_A, Volume_B, and Volume_C are tagged tier3. For file placement purposes, the DST engine treats all of the volumes in a single placement class as equivalent, and balances space allocation approximately equally across them.

To a file system in accordance with one embodiment, a volume tag is simply a character string used to classify a volume. The DST engine imposes no capacity, performance, availability, or other constraints on placement classes. In one embodiment, any volume may be added to any placement class by assigning to it the tag that identifies the class, no matter what its type or the types of other volumes in the class. Practically speaking, however, it is generally good practice to place only volumes with identical, or at least very similar, I/O performance and availability characteristics in a single placement class; in other words, to identify a placement class with a physical storage tier.

Figure 4:
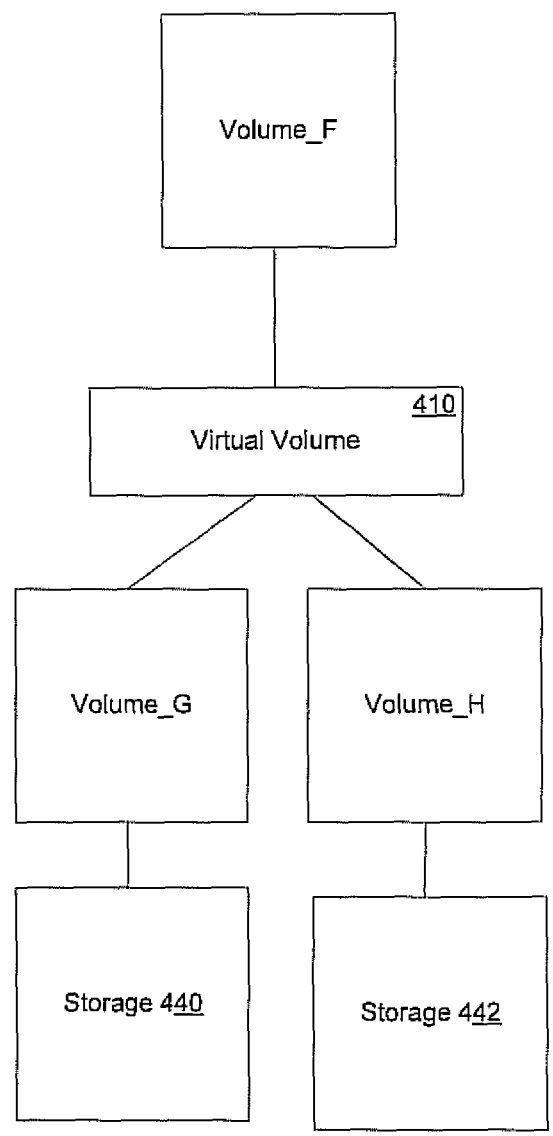
FIG. 4 shows an exemplary virtual volume in accordance with one embodiment of the present invention.

FIG. 4 shows an exemplary virtual volume 410 in accordance with one embodiment of the present invention. As depicted in FIG. 4, Volume_F is implemented by a virtual volume 410. As described above, embodiment of the present invention are able to construct file systems whose logical name spaces are distributed across one or more virtual volumes. The volumes Volume_G and Volume_H are configured from disks or disk array LUNs that belong to a single file system disk group. Volumes may be of different types of storage systems (e.g., storage 340 and storage 342).

Figure 5:
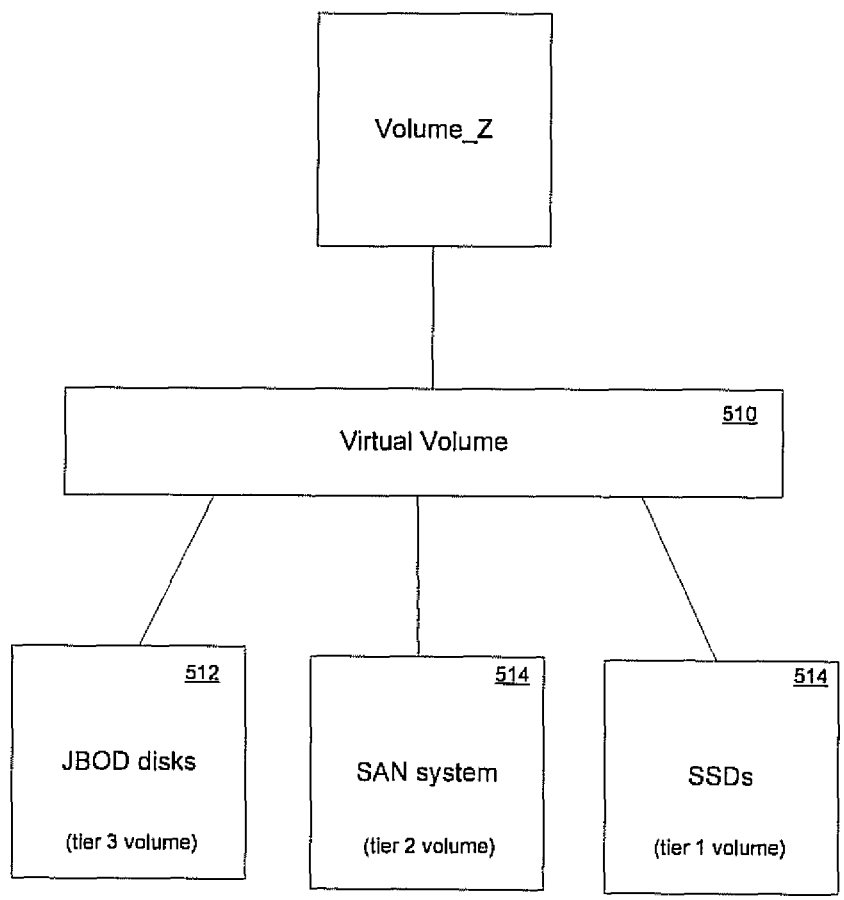
FIG. 5 shows an virtual volume where the physical storage devices supporting virtual volume are depicted in accordance with one embodiment of the present invention.

FIG. 5 shows a virtual volume 510 where the physical storage devices supporting the virtual volume are depicted in accordance with one embodiment of the present invention. As described above, a virtual volume may be of different types of storage systems. As shown in FIG. 5, Volume_Z is implemented by the virtual volume 510, which itself is based on the different hardware technologies. The storage system 512 comprises a typical JBOS system (e.g., SATA disk array LUNs, parallel SCSI JBOD, or so forth). The storage system 514 comprises a SAN system (e.g., Fibre Channel disk array LUNs). The storage system 516 comprises an SSD system. Hence, in one embodiment, reflecting their relative levels of price/performance, storage system 512 corresponds to a tier 3 volume, storage system 514 corresponds to a tier 2 volume and storage system 516 corresponds to a tier 1 volume. The fact that a virtual volume occupies multiple volumes is transparent to applications.

It should be noted that basing storage tiers on virtual volumes offers an important advantage over hardware-based multi-tier storage approaches. For example, unlike hardware-based solutions whose tiers are based on LUNs presented by disk arrays, a virtual volume can be of any required capacity and configuration, even spanning multiple disk arrays if required for I/O performance or failure tolerance reasons. The software based functionality that implements the features and attributes of the DST engine are now described.

Figure 6:
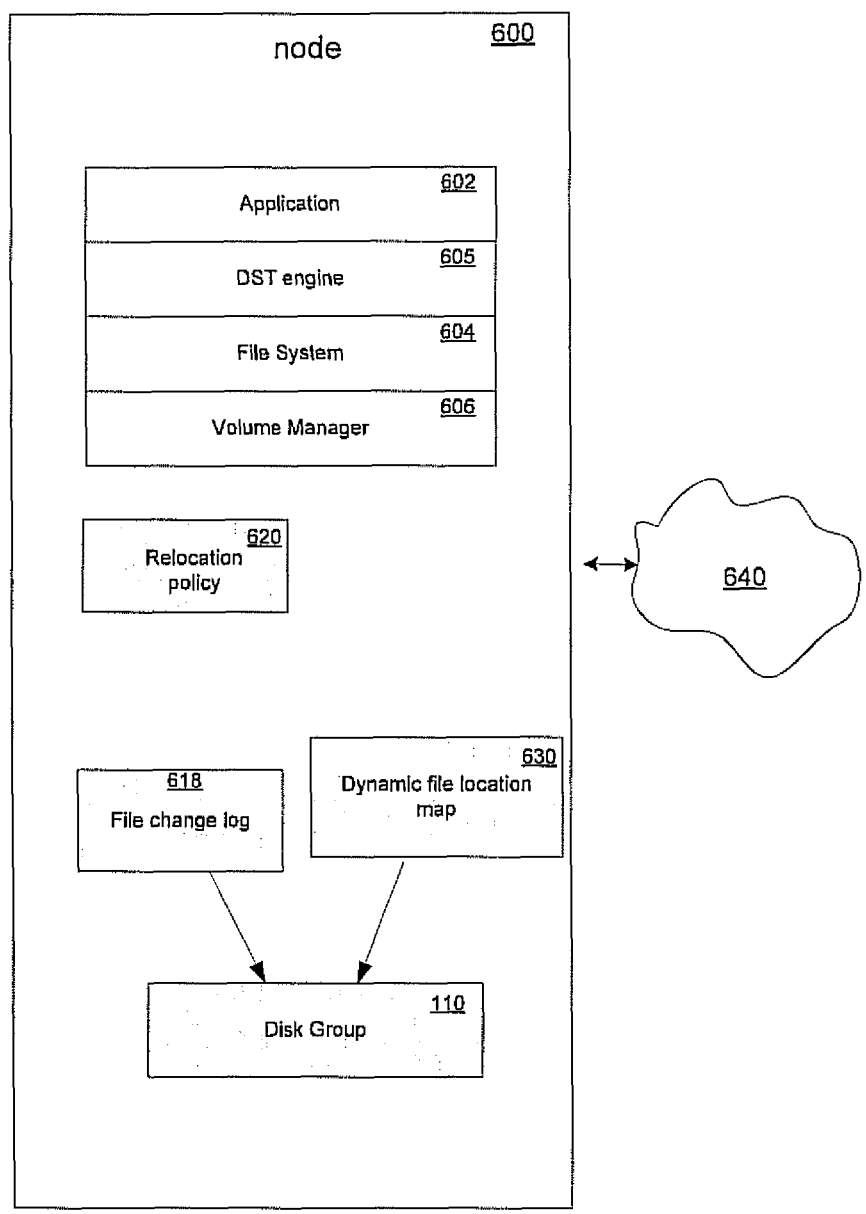
FIG. 6 illustrates a diagram of the software stack of a node operating in a computer system environment according to one embodiment of the present invention.

FIG. 6 illustrates a diagram of the software stack of a node 600 operating in a computer system environment according to one embodiment of the present invention. In the computer system environment of the illustrated embodiment, node 600 includes an application 602, a file system 604, a DST engine 605, and a volume manager 606 as shown. The node 600 further includes a dynamic file location map 630, a file change log 618, and a relocation policy 620. The node 600 is coupled to a network 640 (e.g., LAN, WAN, Internet, etc.) as shown.

In one embodiment, the DST engine maintains the dynamic file location map 630 on persistent storage. The dynamic file location map 630 contains a list of "inodes" of files that occupy space on each volume of a multi-volume file system. The map can be initialized by a scan of the file system's entire inode list, or it can start out empty to be updated gradually.

In one embodiment, the dynamic file location map is updated from two sources: (a) the DST engine's own file relocations, and (b) examination of the file system's File Change Log 618 for changes made outside of the DST engine's scope. Both of these updates occur during the DST engine's relocation scans. The relocation scans are typically scheduled to occur periodically. Alternatively, in one embodiment, the relocation scans can also be run on administrative command.

In one embodiment, the file system file change log(FCL) 618 is a time-limited persistent record of all changes to file system metadata. The file system includes APIs that an application (e.g., application 602) can use to scan the changes made to a file system. Embodiments of the present invention advantageously utilize the FCL records of file creations and deletions.

In one embodiment, the DST engine is configured to periodically scan the FCL, to detect files that have any IO activity during a given period (e.g., hot files). The file location map can be used to compare with the FCL to figure out the files for which no I/O activity is registered (e.g., cold files). This attribute advantageously takes advantage of the fact that it is likely that the number of changes of interest recorded in the FCL is very small relative to the number of files in a large file system, so these are low-impact scans.

It should be noted that in some embodiments, the DST engine's relocation policy rules allow an administrator to limit consideration for relocation to files that reside on specified storage tiers. It should be remembered that in a conventional case, a conventional relocation process must scan the entire list of files and directories (e.g., also referred to as an inode list) or directory hierarchy to determine whether files qualify for relocation based on their current locations. With a DST engine of the present invention, however, once the volume-to-inode map is populated (e.g., dynamic file location map 630), the DST engine has no need to scan the entire file system. It should be noted that only those portions of the FCL which corresponds to the period of interest need to be analyzed, and the scan can be confined to files whose activity is logged therein. Modes in file location map could be compared with inodes in FCL to identify the inodes present in location map and not present FCL, thereby indicating them to be cold files. In almost all cases, this will greatly reduce the system resources consumed by relocation scans, and in particular, make multiple scans per day a practical reality.

It should be noted that embodiments of the present invention have an additional, perhaps more important benefit. With limited-capacity, high-cost storage such as SSDs, it is important to quickly detect and relocate files that have become inactive to free the expensive storage capacity for other, more active files. In one embodiment, the FCL can be used to periodically record "statistics"—levels of I/O activity against individual files. Using the dynamic file location map, the DST engine can quickly determine that a file for which low I/O activity is recorded is located on a tier of interest (e.g., a SSD), and relocate it to a more appropriate tier.

It should be noted that with the FIG. 6 embodiment, the dynamic file location map is updated each time a DST relocation scan is run, as well as each time the DST engine scans the file change log. It should be noted that an objective of embodiments of the present invention is to capture and record changes in a file's volume residency in quasi-real time. Hence, in one embodiment, the present invention could be implemented in the file system kernel. Thus, a record could be created at the time when such changes are made. This would eliminate the need to initialize the dynamic file location map, since the file system would begin to populate it immediately upon creation, and would result in up-to-the-minute map contents. The disadvantage of embedding file location map updates in the file system kernel is that it would perturb significant amounts of stable code for the file system kernel itself. Such critical code typically has a limited number of people that are qualified to modify and maintain it.

On the other hand, in an embodiment where the present invention is implemented in user mode (e.g., as an application), no alterations are required to be made to the file system kernel. Such an embodiment is therefore readily evolvable by a larger cadre of potential developers. Inasmuch as it is likely that improvements to the DST engine and its associated processes will suggest themselves as experience is gained, a user-mode implementation has its advantages.

Additionally, it should be noted that although this invention is described in the context of the Veritas File System, it is applicable to any file system that supports multiple storage tiers and maintains a change log similar to the FCL described herein.

Figure 7:
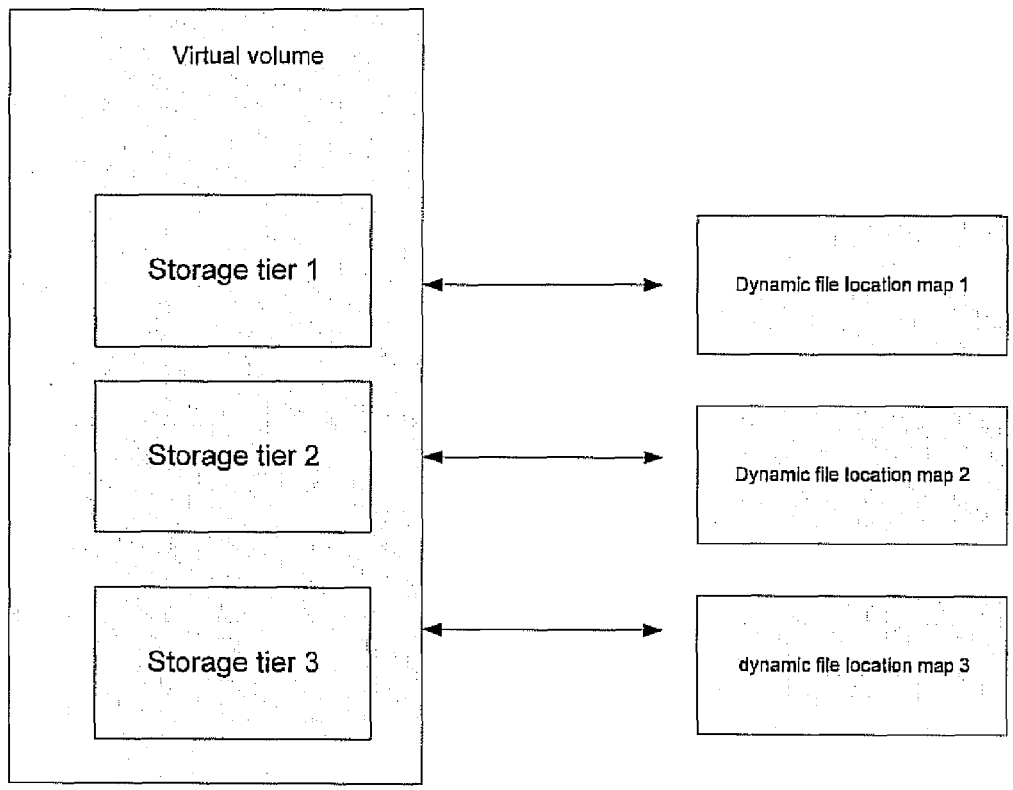
FIG. 7 shows a diagram depicting a per storage tier matched dynamic file location map configuration in accordance with one embodiment of the present invention.

FIG. 7 shows a diagram depicting a per storage tier matched dynamic file location map configuration in accordance with one embodiment of the present invention. It should be noted that the size of the dynamic file location map is much smaller than the size of the file system's metadata, because, in one embodiment, the map contains only storage tier IDs and inode numbers. In other embodiments, it may be advantageous to maintain a separate map for each storage tier instead of a single map for the entire file system, as shown in FIG. 7, where each storage tier has its own corresponding dynamic file location map. This would reduce the map size further, because each map would essentially be a list of inode numbers. The map's compactness would make it practical to store on high-performance storage such as battery-backed RAM or SSD for fast access. It is also possible to cache file location maps in memory.

Figure 8:
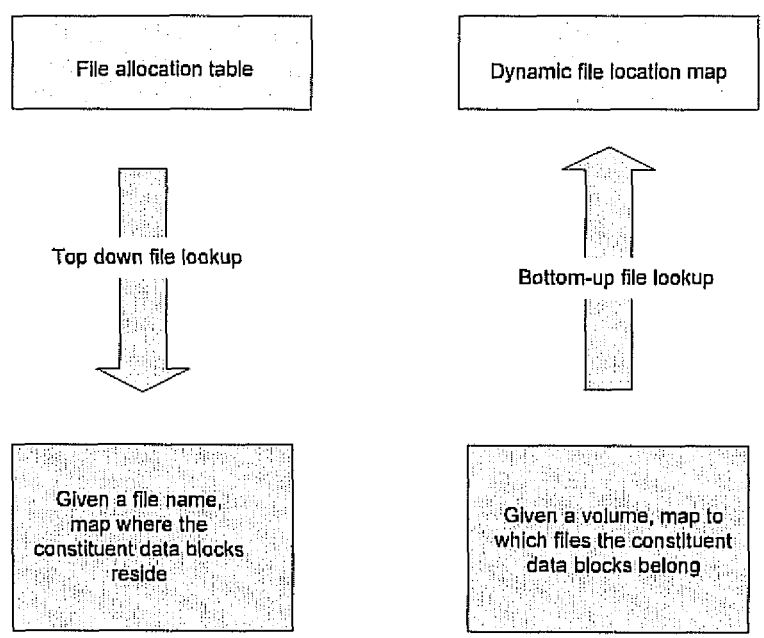
FIG. 8 illustrates an additional advantageous aspect of a dynamic file location map in accordance with one embodiment of the present invention.

FIG. 8 illustrates an additional advantageous aspect of a dynamic file location map in accordance with one embodiment of the present invention. FIG. 8 illustrates the difference between a conventional top-down file map, such as a file allocation table shown in FIG. 8, and a dynamic file location map in accordance with embodiments of the present invention. As depicted in FIG. 8, a file allocation table works in a top-down file lookup arrangement, where given a file name, the software and hardware of a node can follow a map to where the constituent data blocks of the file reside within the hardware of the node. On the other hand, the dynamic file location map operates in reverse, where given a particular one or more volumes, the software and hardware of the node can follow a map from the constituent data blocks stored on the volumes to which particular file the data blocks belong to. Thus, given a dynamic file location map, the DST engine can quickly move data blocks to or from tier 1 storage (e.g., high-performance/high-cost SSD storage) while maintaining coherency of the top-down file lookup mechanisms. This aspect can make relocation completely transparent to an application.

Figure 9:
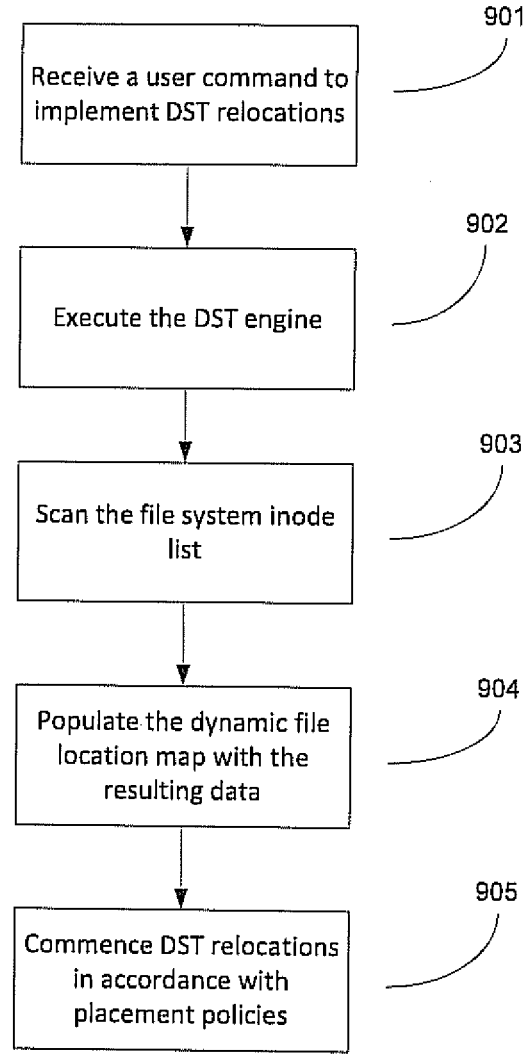
FIG. 9 shows a flow chart of an initialization process in accordance with one embodiment of the present invention.

FIG. 9 shows a flow chart of an initialization process 900 in accordance with one embodiment of the present invention. As depicted in FIG. 9, process 900 shows the initialization steps taken to initialize the DST engine to perform DST relocations.

Process 900 begins in step 901, where the DST engine receives a user command to implement DST relocations. As described above, the DST engine's relocation policy rules allow an administrator to control the manner in which files are relocated so that they reside on specified storage tiers. In one embodiment, the configuration of the DST engine is completely configurable and can be applied to existing volumes, new volumes, etc. Subsequently, in step 902, the DST engine is executed.

In step 903, the DST engine scans the file system inode list. As described above, in one embodiment, the dynamic file location map (e.g., map 630) contains a list of "inodes" of files that occupy space on each volume of a multi-volume file system. The map can be initialized by a scan of the file system's entire inode list, or it can start out empty to be updated gradually, such as when DST relocations are performed, and by scanning FCL for creations and deletions that may have happened outside the purview of the DST engine. In the FIG. 9 embodiment, the file system's entire inode list is scanned during this initialization process. And subsequently, in step 904, the dynamic file location map is populated with the resulting data. The dynamic file location map contains a list of "inodes" of files that occupy space on each volume of a multi-volume file system. In step 905, the DST engine commences DST relocations in accordance with the placement policies (e.g., as specified and configured by an administrator).

Figure 10:
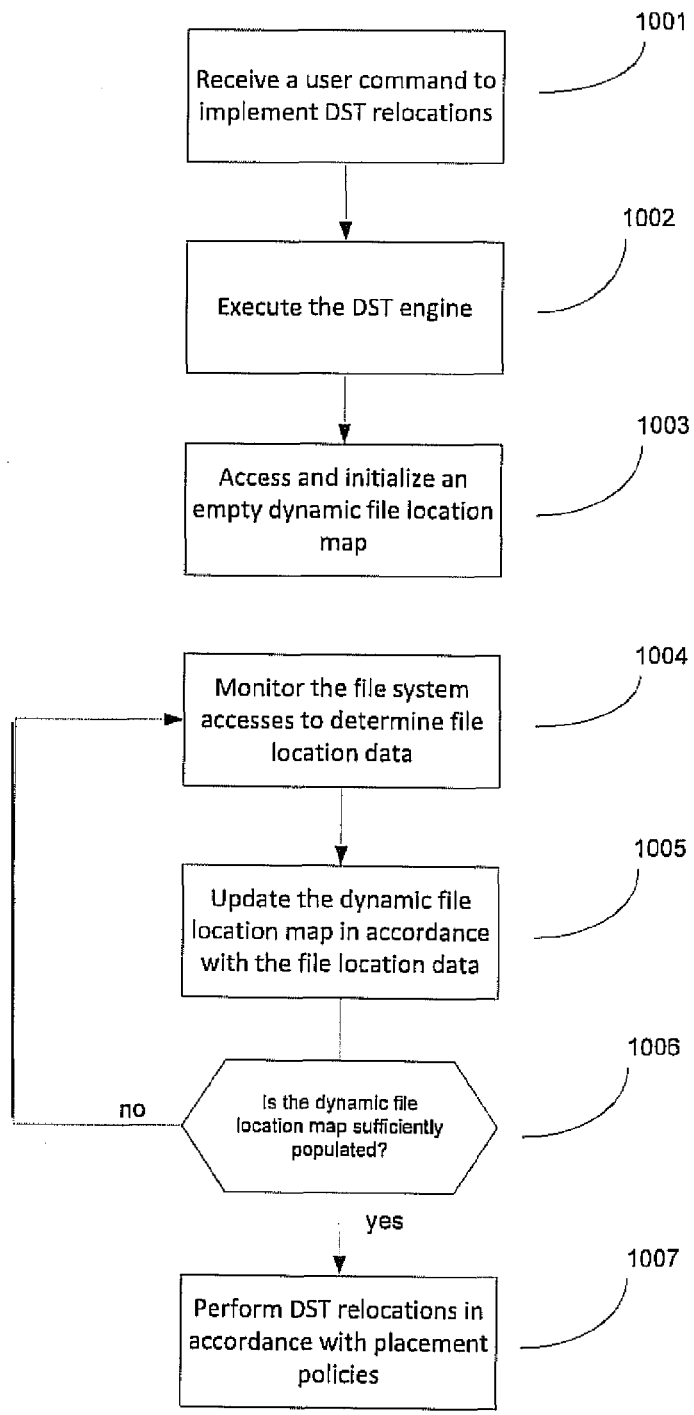
FIG. 10 shows a flow chart of a second initialization process in accordance with one embodiment of the present invention.

FIG. 10 shows a flow chart of a second initialization process 1000 in accordance with one embodiment of the present invention. As depicted in FIG. 9, process 1000 shows the initialization steps taken to initialize the DST engine to perform DST relocations, however, in this embodiment, the dynamic file location map starts out empty and is gradually populated by the DST engine.

Process 1000 begins in step 1001, where the DST engine receives a user command (e.g., from an administrator) to implement DST relocations. As described above, the DST engine's relocation policy rules allow an administrator to control the manner in which files are relocated so that they reside on specified storage tiers. Subsequently in step 1002, the DST engine is started and begins its processing.

In step 1003, the DST engine accesses and initializes an empty dynamic file location map. Then in step 1004, the DST engine monitors the file system accesses to determine file location data. In step 1005, the dynamic file location map is updated in accordance with the file location data. In this manner, the dynamic file location map is gradually updated with file location information, as opposed to being populated by performing an initial scan (e.g., as with process 900).

In step 1006, the DST engine determines whether the dynamic file location map is sufficiently populated. If the file location map is populated enough to commence relocations, process 1000 proceeds to step 1007, where DST relocations are performed in accordance with the placement policies. If the file location map is not sufficiently populated, process 1000 returns to step 1004 and continues to monitor the file system accesses to determine file location data. As described above, in one embodiment, the present invention could be implemented in the file system kernel. Thus, a record (e.g., the dynamic file location map) could be created at the time when such changes are made. This would eliminate the need to initialize the dynamic file location map, since the file system would begin to populate it immediately upon creation, and would result in up-to-the-minute map contents.

Figure 11:
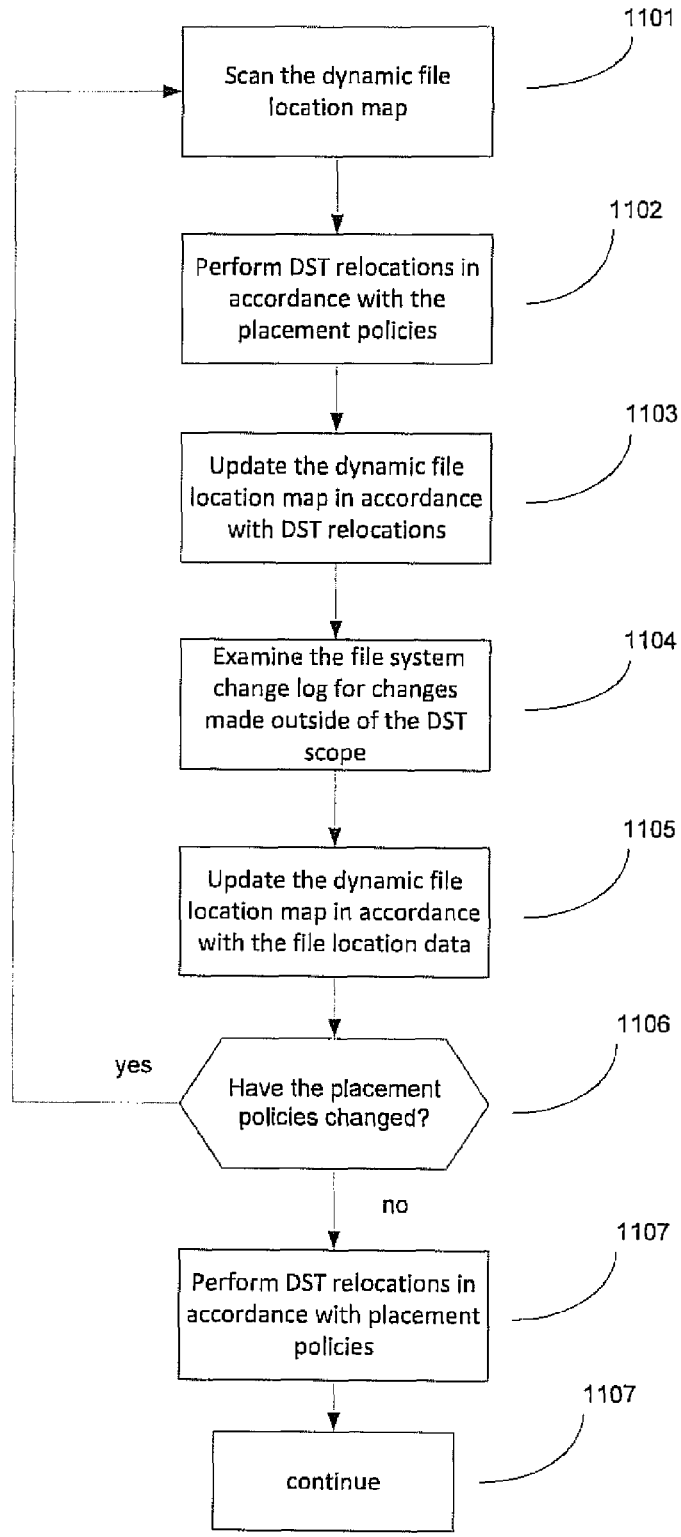
FIG. 11 shows a flow chart of the operating steps of a DST relocation process in operation subsequent to initialization in accordance with one embodiment of the present invention.

FIG. 11 shows a flow chart of the operating steps of a DST relocation process 1100 in operation subsequent to initialization in accordance with one embodiment of the present invention. As depicted in FIG. 11, process 1100 shows the operating steps of the DST engine taken to relocate files in accordance with the placement policy in effect.

FIG. 11 begins in step 1101, where the DST engine scans the dynamic file location map. As described above, in one embodiment, the DST engine maintains the dynamic file location map (e.g., map 630) on persistent storage. The dynamic file location map contains a list of "inodes" of files that occupy space on each volume of a multi-volume file system. The dynamic file location map is much smaller than the file system metadata, and thus can be scanned much more quickly to identify files of interest. Subsequently, in step 1102, the DST engine performs DST relocations in accordance with the placement policies. Any files of interest identified in step 1101 are now relocated in accordance with the placement policies. In step 1103, the dynamic file location map is updated in accordance with the relocations made by the DST engine itself.

In step 1104, the file system change log is examined for changes made outside the scope of the DST engine. As described above, in one embodiment, the dynamic file location map is updated from two sources: (a) the DST engine's own file relocations, and (b) examination of the file system's File Change Log (e.g., log 618) for changes made outside of the DST engine's scope. Both of these updates occur during the DST engine's relocation scans. The relocation scans are typically scheduled to occur periodically, or in the alternative, run on administrative command. Subsequently, in step 1105, the dynamic file location map is updated in accordance with the file location data. As described above, in one embodiment, the DST engine periodically scans the FCL, using file creation and deletion records to update its dynamic file location map of files that occupy space on each of a file system's volumes.

In step 1106, the DST engine determines whether the placement policies have been changed. For example, placement policies can be changed based upon file system workload, file system scheduling, administrator command, or the like. If the placement policies have been changed, process 1100 proceeds back to step 1101 where the dynamic file location map is scanned under the new placement policies. If the placement policies have not been changed, process 1100 proceeds to step 1107, where the DST engine performs DST relocations in accordance with the placement policies in effect. The DST relocation process subsequently continues, as indicated by step 1107.

Figure 12:
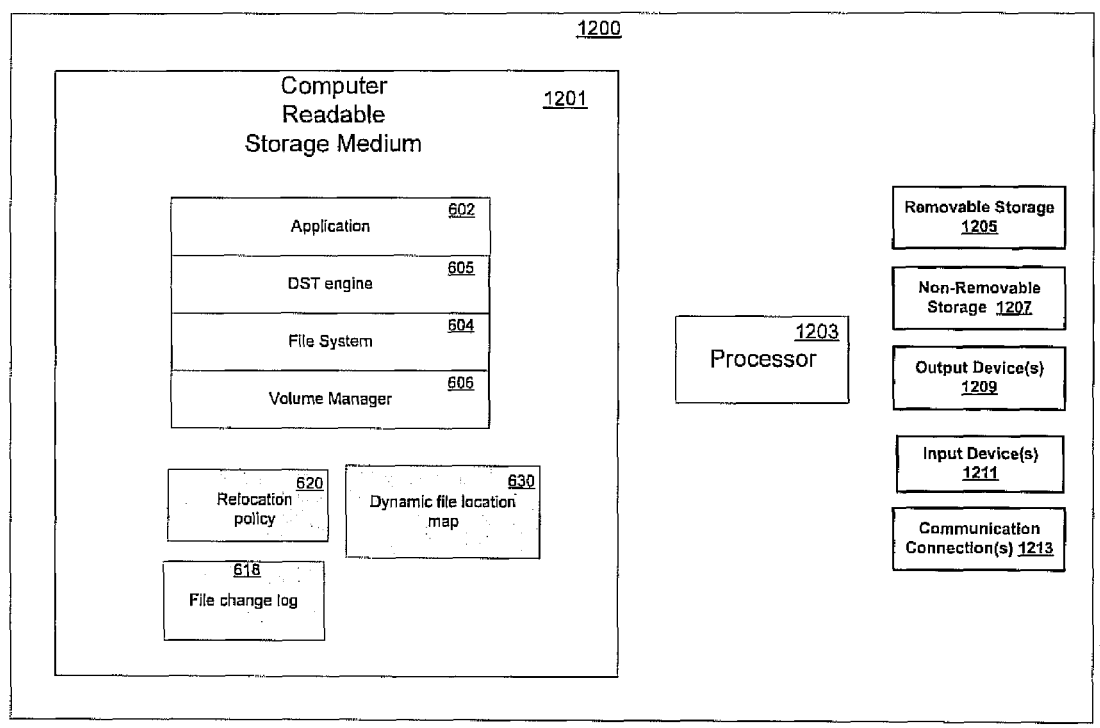
FIG. 12 shows an exemplary computer system according to one embodiment of the present invention.

FIG. 12 shows an exemplary computer system 1200 according to one embodiment. Computer system 1200 depicts the components of a basic computer system providing the execution environment for certain hardware-based and software-based functionality for the above described embodiments. For example, computer system 1200 can be a system upon which the one or more software stacks (e.g., modules 602-630) from FIG. 6 are instantiated. Computer system 1200 can be implemented as, for example, a server computer system, workstation computer system, desktop computer system, or laptop computer system. Similarly, computer system 1200 can be implemented as a handheld device. Computer system 1200 typically includes at least some form of computer readable media (e.g., computer readable storage medium 1201). Computer readable media can be a number of different types of available media that can be accessed by computer system 1200 and can include, but is not limited to, computer storage media.

In its most basic configuration, computer system 1200 typically includes processing unit 1203 and memory 1201. Depending on the exact configuration and type of computer system 1200 that is used, memory 1201 can be volatile (e.g., such as DRAM, etc.) 1201*a*, non-volatile 1201*b* (e.g., such as ROM, flash memory, etc.) or some combination of the two. Similarly, the memory 1201 can comprise other devices besides solid-state devices, such as, for example, magnetic disk-based media, optical media, or the like.

Additionally, computer system 1200 can include other mass storage systems (e.g., removable 1205 and/or non-removable 1207) such as magnetic or optical disks or tape. Similarly, computer system 1200 can include input devices 1209 and/or output devices 1211 (e.g., such as a display). Computer system 1200 can further include network connections 1213 to other devices, computers, networks, servers, etc. using either wired or wireless media. As all of these devices are well known in the art, they need not be discussed in detail.

It should further be noted, that the computer system 1200 can have some, most, or all of its functionality supplanted by a distributed computer system having a large number of dispersed computing nodes, such as would be the case where the functionality of the computer system 1200 is partly or wholly executed using a cloud computing environment.

Figure 13:
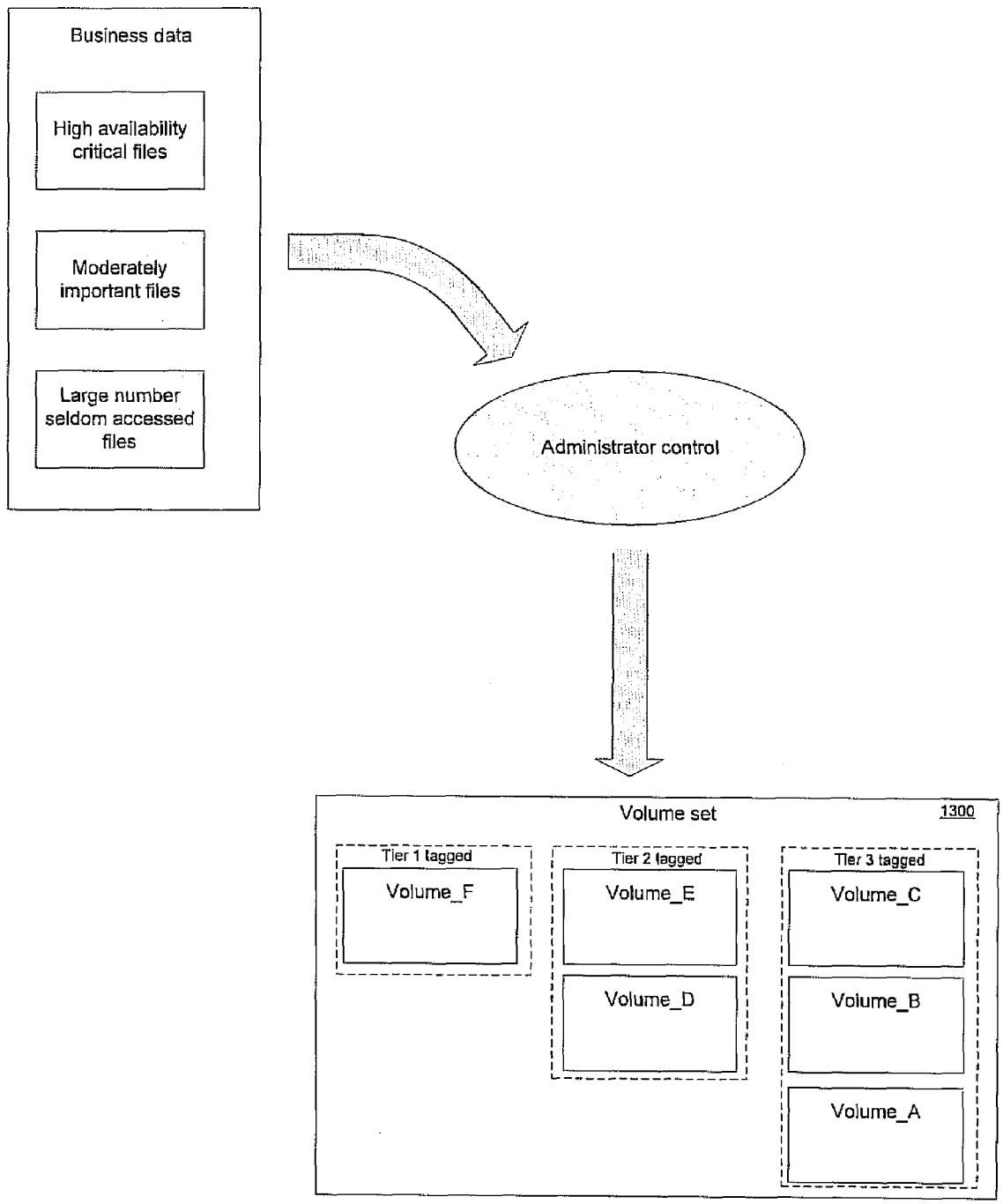
FIG. 13 shows a diagram depicting business data allocation among storage tiers in accordance with embodiments of the present invention.

FIG. 13 shows a diagram depicting business data allocation among storage tiers in accordance with embodiments of the present invention. Embodiments of the present invention regarding DST relocation policy rules and the file criteria of interest for relocation decision making are now described.

As described above, administrators of multi-volume file systems can control the locations of files within volume sets, such as volume set 1300, by defining file placement policies that control both initial file location and the circumstances under which existing files are relocated. A file system file placement policy consists of rules that restrict the locations of files to administrator-defined subsets of the volumes in a file system's volume set. These subsets are called placement classes. In this manner, the administrator controls the placement of the business data within the volume set. A placement class is typically identified with a storage tier. Policy rules cause files to be created and extended within specified placement classes, and to be relocated to other placement classes when they meet certain naming, activity, access rate, and size-related qualifications.

As an example, FIG. 13 shows a multi-volume file system 1300 whose volume set consists of three placement classes called tier1, tier2, and tier3. Such a volume set might be suitable for a file system containing a few high availability critical files (tier1), a larger number of moderately important files (tier2), and a still larger number of seldom accessed/inactive files (tier3). The placement policies enable administrator control that ensures the business data is allocated among the tiers as suited.

Hence, FIG. 13 illustrates the manner in which the DST engine places files among the volumes of a file system's volume set in accordance with the file system's active file placement policy. In one embodiment, a file placement policy consists of rules that govern the initial location and subsequent relocation of designated sets of files. A rule may designate the files to which it applies by name, by directory, by ownership, or by combinations of the three. In one embodiment, policy rules specify where files should be placed in terms of placement classes rather than specific volumes. This attribute makes it unnecessary to change a file system's active placement policy when volumes are added to or removed from its volume set. Moreover, because the volume tags that define placement classes need not be unique, one placement policy can be used for any number of file systems with similar requirements and storage complements.

In one embodiment, policy rules specify both initial allocation destinations and relocation destinations as priority-ordered lists of placement classes. Files are allocated in the first placement class in the list if free space permits, in the second class if no free space is available in the first, and so forth.

In one embodiment, file relocation is performed when a policy is enforced, either on-demand or periodically, and is similar to initial allocation. For example, in one embodiment, files are relocated to the first placement class listed in the rule that selects them if space is available, to the second class if no space is available in the first, and so forth.

Depending upon the rules specified by the administrator, file relocation may be unconditional, or it may be based on qualifications such as time since most recent access or modification, intensity of access by applications (I/O temperature), and file size. In one embodiment, a file system's policy for allocating and relocating files is expressed in a set of internal data structures called its active file placement policy (e.g., relocation policy 620). For example, in one embodiment, administrators can write file placement policies in the XML language in accordance with fields and services supplied with certain multivolume file systems. For example, a file system can implement a graphical management console that specifically includes wizards that create four popular types of policies in accordance with user-supplied parameters.

It should be noted that file placement policies are not inherently bound to specific file systems. An administrator assigns a policy to a file system, making it the file system's active policy. For example, in one embodiment, a file system typically has only one active policy at a time. When assigned to a file system, a file placement policy allocates and relocates files among the placement classes that are named in the policy and represented by tags assigned to the volumes.

Embodiments of the present invention regarding file criteria of interest for DST relocation are now described. In accordance with embodiments of the present invention, a criterion of interest regarding file relocation is the amount of I/O activity against a file over a specified period, measured either in read, write, or transfer (combined read and write) operations or bytes read, written, or transferred. Since certain embodiments of the present invention apply to all of these criteria, they are collectively referred to as TEMPERATURE in this description. As described above, the file system File Change Log (FCL) is a persistent circular log in which the file system records all changes to files. Additionally, the FCL can be configured to periodically record "I/O statistics," which include the number of read and write operations and the number of bytes read and written for files whose inodes are cached in memory.

In a conventional case, an approximation of file read and write activity over a specified interval (called INTERVAL as referred to herein) can be computed by subtracting the I/O statistics in a file's oldest in-INTERVAL FCL record from those in the newest (and, in the case of bytes read and/or written, normalizing the result by dividing by file size). While this approximation is reasonable, it has proven difficult for users to specify specific I/O thresholds for relocation. It requires non-trivial experimentation to arrive at proper thresholds for each file system. Secondly when IO conditions change with application load, these thresholds need to be reworked, which requires experimentation. Additionally, conventional scanning of the file system metadata cannot scale effectively with the increasing file system size. In contrast, embodiments of the present invention advantageously utilizes its attributes to optimally specify appropriate I/O activity thresholds as relocation criteria (applicable to both rotating and SSD storage), implement DST relocation with greatly reduced impact of relocation scans on production activity, and automatically choose the "right" files to utilize limited SSD resources effectively.

The above described functionality of embodiments of the present invention is implemented via the following two attributes. The first attribute is to use the FCL records and dynamic file location map to identify files that may qualify (e.g., are candidates) for I/O activity-based relocation rather than full file system scans. The second attribute is the utilization of the enhanced DST engine TEMPERATURE-based file relocation criteria to (1) calculate the ratio of per-file activity during INTERVAL relative to overall file system activity over a longer period (called AveragePeriod as referred to herein), and (2) select files for relocation based on highest ratio of activity during INTERVAL to file system activity during AveragePeriod (called ACTIVITY-RATIO as referred to herein).

It should be noted that in one embodiment, the DST process is focused on quickly identifying cold files. In such an embodiment, files having an activity less than a given value of threshold ratio will be evacuated.

With respect to using the FCL records and dynamic file location map to identify files for relocation, as described above, the number of files active during a typical INTERVAL is typically a small fraction of the total number of files in a file system. Thus, as described above, a scan of the FCL to identify files active during an INTERVAL is typically much faster than a scan of a file system's entire inode list.

In one embodiment, to identify low-activity files on tiers of interest, an administrator specifies the storage tier(s) of interest when scheduling relocation scans, the DST engine uses the dynamic file location map to select files located on the tiers of interest (e.g., tier 1 volumes comprising of SSD-based storage). In summary, the DST engine scans the FCL to determine which files are active and uses the dynamic allocation to determine which files are located on tier(s) of interest, independent of the activity against them, thereby performing a reverse lookup as described in the discussion of FIG. 8 above.

With respect to calculating the ratio of per-file activity during INTERVAL relative to overall file system activity over a longer period, in one embodiment, the DST engine calculates per-file I/O activity during INTERVAL for active files as described above. In addition, it calculates total file system activity during AveragePeriod.

For each file during INTERVAL, the DST engine computes an ACTIVITY-RATIO by dividing INTERVAL file activity by total file system activity during AveragePeriod.

With respect to selecting files for relocation based on highest ratio of activity during INTERVAL to file system activity during AveragePeriod, in one embodiment, the DST engine relocates files whose ACTIVITY RATIO is below a LOW-THRESHOLD from the tiers of interest, and, starting with the highest, relocates files whose ACTIVITY-RATIOs exceed a specified HIGH-THRESHOLD to the tier(s) of interest (presumably tier 1 storage SSDs, although the embodiments are effective for rotating disc media storage as well).

Figure 14:
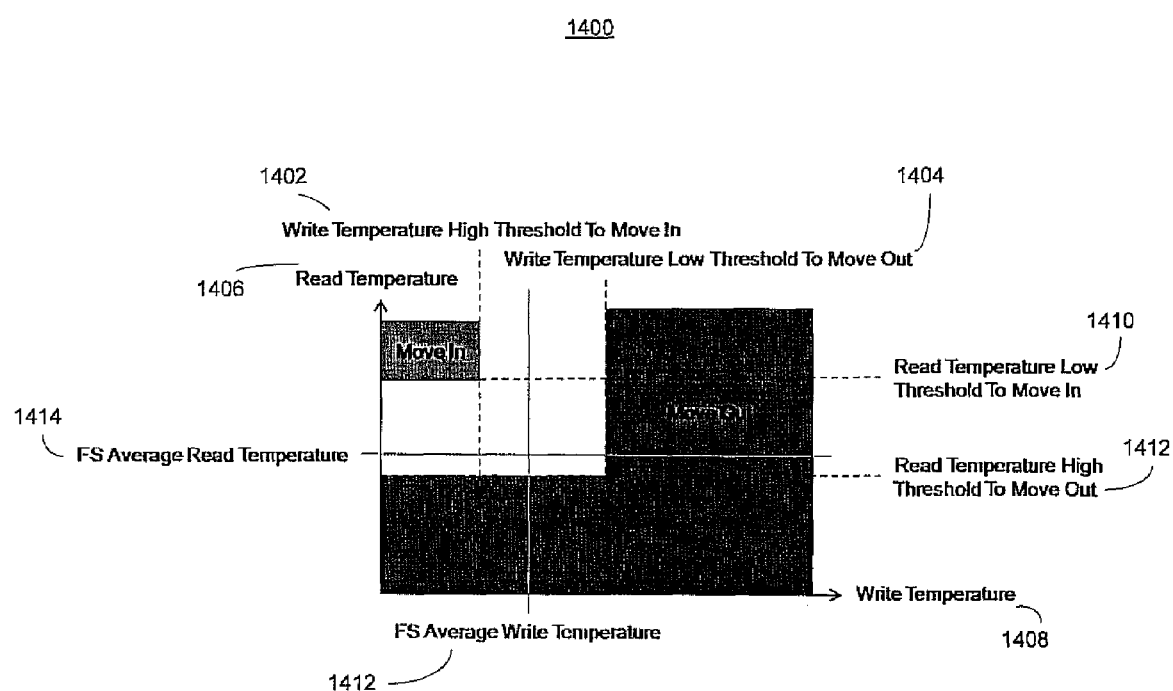
FIG. 14 shows a diagram graphically illustrating the use of the computed I/O temperature to control DST relocations in accordance with one embodiment of the present invention.

FIG. 14 shows a diagram 1400 graphically illustrating use of the computed I/O temperature to control DST relocations in accordance with one embodiment of the present invention. As depicted in FIG. 14, the computed I/O temperature can be used to determine when to move certain files into high-value/high performance tier 1 storage (e.g., SSDs) and when to move certain files out.

In one embodiment, the DST engine is focused on a move out of cold files. In such an embodiment, the DST engine just scans the list of files that have been built up in the file location map, and for each such file, computes its file specific temperature and then the ratio to the file system level activity. The DST engine then looks at the threshold as per the policy. If the activity ratio of the file falls below the threshold in the policy, the file is considered cold and moved out to the location as per the policy. In such an embodiment, DST processing stops once the list of files in the location map is exhausted instead of scanning the whole file system. Thus, such an embodiment is directed to processing quickly while using less resources.

As shown in FIG. 14, thresholds are computed for both when to move files into the particular tier storage in this example, a tier 1 volume. The vertical axis 1406 represents read temperature and the horizontal axis 1408 represents write temperature. The write temperature high threshold to move in 1402 and the write temperature low threshold to move out 1404 are generated. Similarly, the read temperature high threshold to move out 1412 and the read temperature low threshold to move in 1410 are generated. Their relationships to the underlying file system average read temperature 1414 and file system average write temperature 1412 can be seen.

Thus, a diagram 1400 shows characteristics of tier 1 SSD-based storage, wherein files having high read temperature and low write temperature are preferentially selected to be moved into the SSD-based storage devices. This reflects the characteristics of SSDs, whereby they are very much faster for random-access reading than rotating disc media. However, the advantages, if any at all, are not as significant with sequential writes.

The lines below are a sample of the relevant portions of the enhanced XML grammar used to specify DST relocation policy rules that might be used to relocate active files into tier 1 SSD storage. They illustrate how an administrator would make use of certain embodiments of the present invention.

---
Pseudo code program A
---
```
< PLACEMENT_POLICY Name="Policy1" Version="5.0"
AveragePeriod="30">
    ...
    <RELOCATE>
        ...
        <WHEN>
            <IOTEMP Type="nrbytes" Prefer="high"
Average="*"
                AccessType="random">
                <MIN Flags="gteq"> 1.5 </MIN>
                <PERIOD Units="hours"> 3 </PERIOD>
            </IOTEMP>
        </WHEN>
    </RELOCATE>
```
---

In the example above, the following conditions are true:

AveragePeriod: Represents the period over which the DST engine computes I/O activity for all files in the file system that are active during the period (this is a new DST engine feature in support of certain embodiments of the present invention).

PERIOD: A keyword of the DST grammar whose value is INTERVAL as defined above.

AccessType="random": Specifies that files accessed randomly are to be preferred over those of equal ACTIVITY RATIO that are accessed sequentially (this is a new DST engine feature in support of certain embodiments of the present invention).

MIN Flags='gteq' 1.5: Specifies the HIGH-THRESHOLD for relocation. This example should be read as "If a file's ACTIVITY-RATIO exceeds 1.5, the file is a candidate for relocation to the target tier(s)".

Prefer="high": Indicates that high I/O activity is the relocation criterion (rather than low), and specifies relocation if ACTIVITY-RATIOs of qualifying files exceed the threshold (this is a new DST feature in support of certain embodiments of the present invention).

Average="*": The asterisk indicates that the DST engine should use the AveragePeriod when computing ACTIVITY-RATIO (this is a new DST feature in support of certain embodiments of the present invention).

The lines below are a sample of the relevant portions of the enhanced XML grammar used to specify DST relocation policy rules that might be used to relocate less active files from SSDs. They illustrate how an administrator would make use of certain embodiments of the present invention. This rule would normally precede that given above.

---
Pseudo code program B
---
```
    ...
    <RELOCATE>
        ...
        <WHEN>
            <IOTEMP Type="nrwbytes" Average="*">
                <MAX Flags="lt"> 0.5 </MAX>
                <PERIOD Units="hours"> 6 </PERIOD>
            </IOTEMP>
        </WHEN>
    </RELOCATE>
```
---

MAX Flags='lt' 0.5: Specifies the LOW-THRESHOLD for relocation. This example should be read as "If a file's ACTIVITY RATIO during the specified PERIOD is less than 0.5, relocate the file to other (i.e., non-SSD) tiers".

Figure 15:
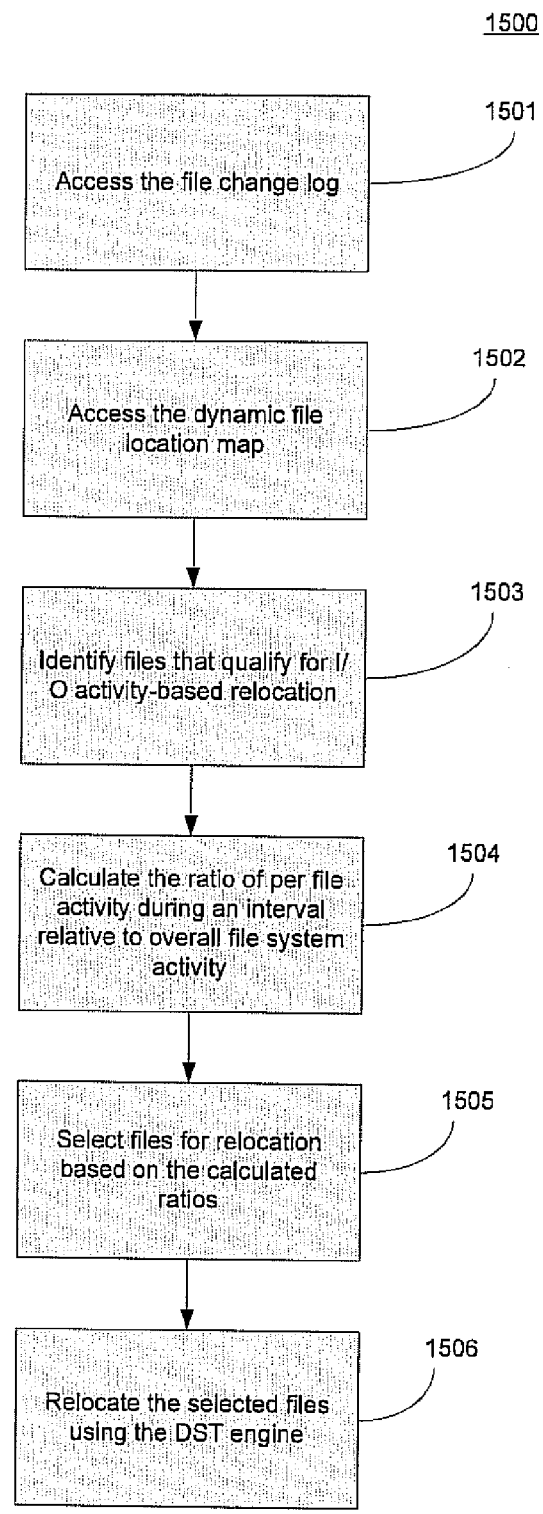
FIG. 15 shows a flow chart of the steps of a process for using I/O temperature to relocate files into and out of a storage tier in accordance with one embodiment of the present invention.

FIG. 15 shows a flow chart of the steps of a process 1500 for using I/O temperature to relocate files into and out of a storage tier in accordance with one embodiment of the present invention. As depicted in FIG. 15, the storage tier of interest comprises SSD storage devices.

Process 1500 begins in step 1501, where the DST engine accesses the file change log, and step 1502, where the DST engine accesses the dynamic file location map. In step 1503, based upon the information, the DST engine identifies files that are qualified for I/O activity-based relocation.

In step 1504, the DST engine calculates the ratio of per file activity during an interval relative to overall file system activity. As described above, the DST engine (1) calculates the ratio of per-file activity during INTERVAL relative to overall file system activity over a longer period (called AveragePeriod as referred to herein), and (2) selects files for relocation based on highest ratio of activity during INTERVAL to file system activity during AveragePeriod.

It should be noted that in one embodiment, the DST engine is focused on moving out cold files from the high performance/high cost storage tier. As described above, the DST engine scans the list of files that have built up in the file location map, and for each such file, computes its file specific temperature and then the ratio to the file system level activity, and looks at the threshold as per the policy. If the activity ratio of the file falls below the threshold in the policy, the file is considered cold and moved out to the location as per the policy. As described above, in such an embodiment, the DST engine stops processing once the list of files in the location map are exhausted instead of scanning the whole file system. In step 1505, files are selected for relocation based on the calculated ratios. Subsequently, in step 1506, the selected files are relocated using the DST engine.

Figure 16:
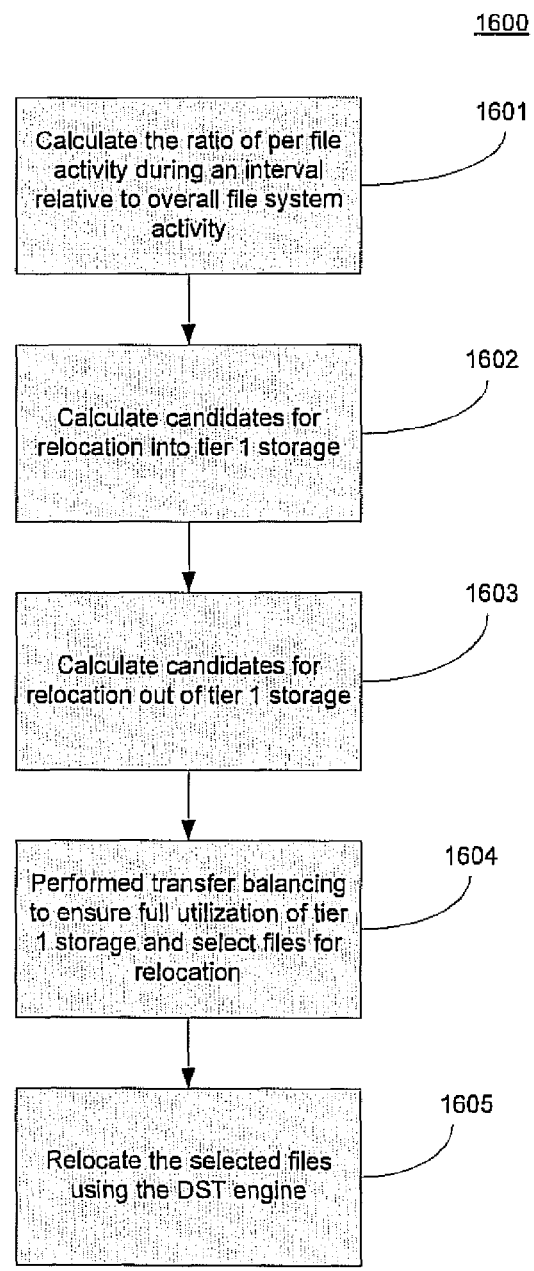
FIG. 16 shows a flow chart of the steps of a process for using I/O temperature to particularly select files for transfer into tier 1 storage and to particularly select files for transfer out of tier 1 storage in accordance with one embodiment of the present invention.

FIG. 16 shows a flow chart of the steps of a process 1600 for using I/O temperature to particularly select files for transfer into tier 1 storage and to particularly select files for transfer out of tier 1 storage in accordance with one embodiment of the present invention.

Process 1600 begins in step 1601, where the DST engine calculates the ratio of per file activity during an interval relative to overall file system activity. As described above, the DST engine accesses the file change log and the dynamic file location map, and based upon the information, identifies files that are qualified for I/O activity-based relocation. In step 1602, the DST engine specifically calculates candidates for relocation into tier 1 storage. As described above, files experiencing high random reads are preferred, and are identified by the DST engine (e.g., pseudo code program A). In step 1603, the DST engine calculates candidates for relocation out of tier 1 storage. Generally, as described above, once read access I/O temperature falls below the computed threshold a particular file becomes a candidate for relocation out of tier 1 storage (e.g., pseudo code equation B).

In step 1604, the DST engine performs transfer balancing to ensure full utilization of tier 1 storage and selects which particular files will be relocated. In other words, in one embodiment, the DST engine will balance the files that are transferred out of tier 1 storage against the files are transferred into tier 1 storage in an attempt to ensure the tier 1 storage is fully utilized. In step 1605, the selected files are relocated using the DST engine.

Figure 17:
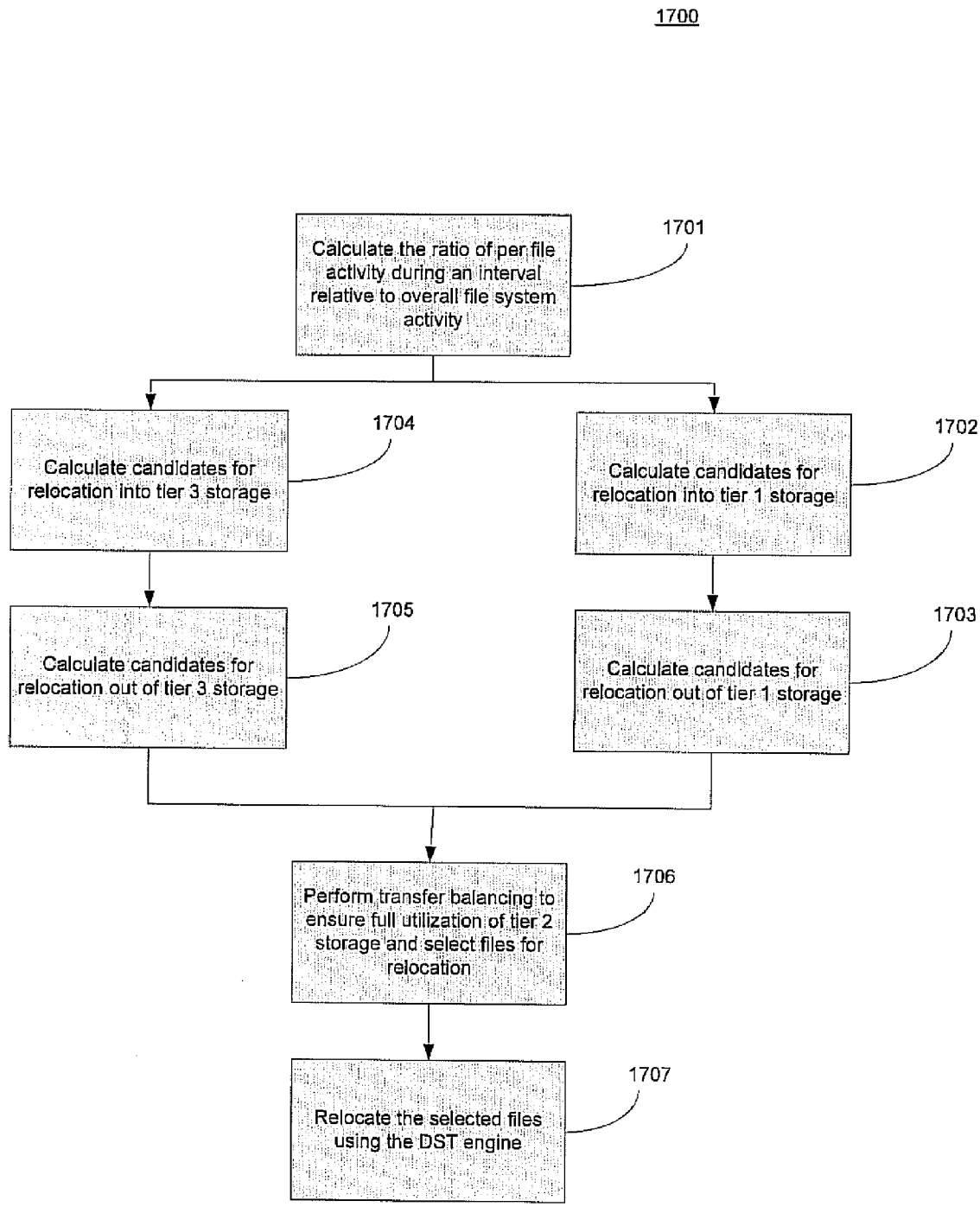
FIG. 17 shows a flow chart of the steps of a process for using I/O temperature to particularly select files for transfer into tier 2 storage and to particularly select files for transfer out of tier 2 storage in accordance with one embodiment of the present invention.

FIG. 17 shows a flow chart of the steps of a process 1700 for using I/O temperature to particularly select files for transfer into tier 2 storage and to particularly select files for transfer out of tier 2 storage in accordance with one embodiment of the present invention.

Process 1700 begins in step 1701, where the DST engine calculates the ratio of per file activity during an interval relative to overall file system activity. As described above, the DST engine accesses the file change log and the dynamic file location map, and based upon the information, identifies files that are qualified for I/O activity-based relocation. Process 1710 then takes two parallel paths.

In step 1702, the DST engine specifically calculates candidates for relocation into tier 1 storage. As described above, files experiencing high random reads are preferred, and are identified by the DST engine (e.g., pseudo code program A). In step 1703, the DST engine calculates candidates for relocation out of tier 1 storage. Generally, as described above, once read accesses I/O temperature falls below the computed threshold a particular file becomes a candidate for relocation out of tier 1 storage (e.g., pseudo code equation B).

In step 1704, the DST engine specifically calculates candidates for relocation into tier 2 storage. As described above, files experiencing high random reads are preferred, and are identified by the DST engine, however, tier 2 storage is typically rotating disc media. Thus, there is not as strong a preference for random-access reads. In step 1705, the DST engine calculates candidates for relocation out of tier 2 storage. Generally, as described above, there is not a strong a preference for read accesses with tier 2 storage. Thus, once read or write access I/O temperature falls below the computed threshold a particular file becomes a candidate for relocation out of tier 2 storage and into tier 3 storage. As described above, tier 3 storage is typically used for seldom accessed files.

Subsequently, in step 1706, the DST engine performs transfer balancing to ensure full utilization of tier 2 storage, subject to the earlier described condition of ensuring full utilization of tier 1 storage, and selects files for relocation. In other words, for performance reasons it is to the file system's advantage to put the most time sensitive and critical data in tier 1 storage, while also ensuring full utilization of tier 2 storage before transferring files into the low performance of tier 3 storage. In step 1707, the selected files are relocated using the DST engine.

Figure 18:
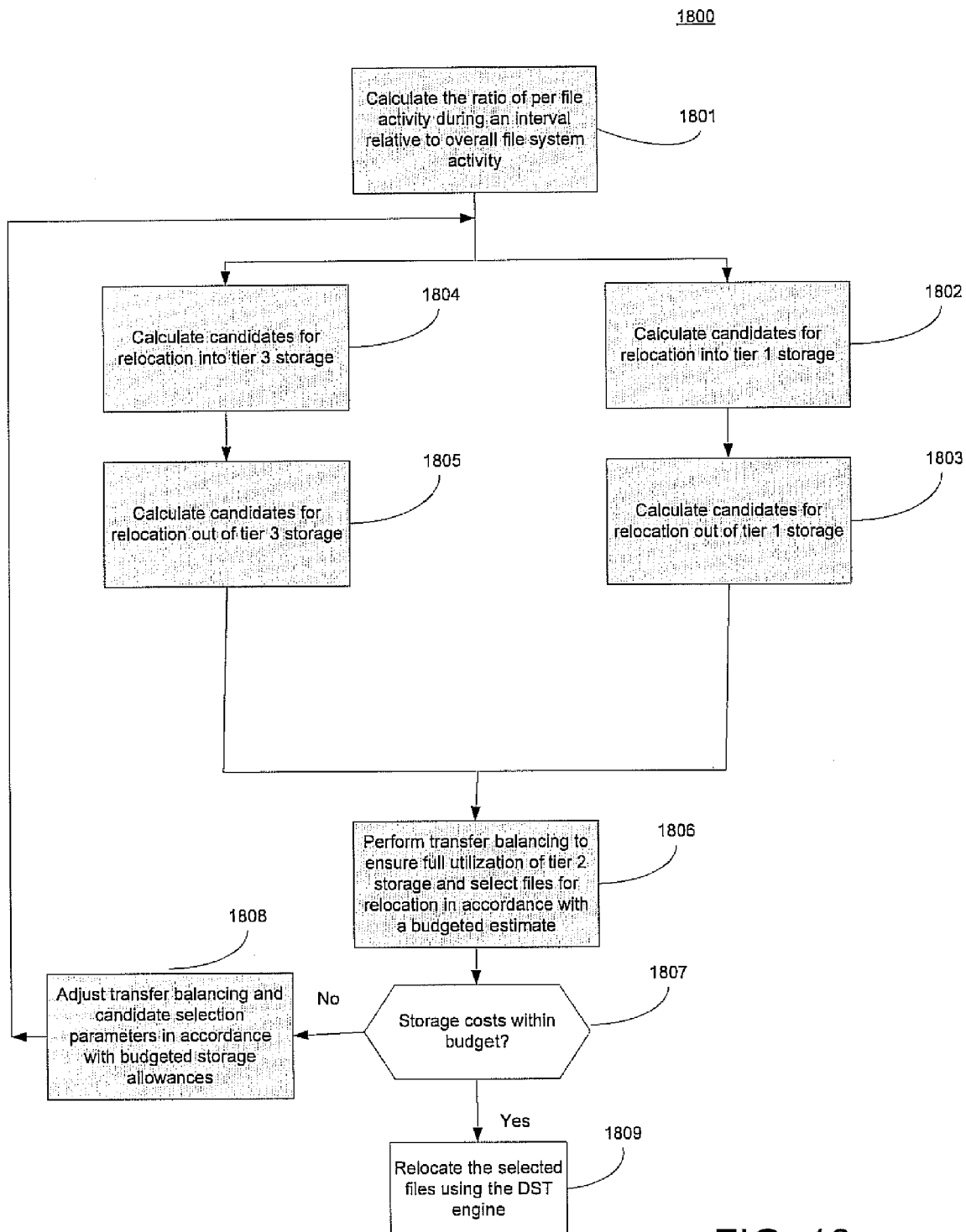
FIG. 18 shows a flow chart of the steps of a process 1800 for dynamic storage tiering in a cost constrained environment while using I/O temperature to particularly select files for transfer into tier 2 storage and to particularly select files for transfer out of tier 2 storage in accordance with one embodiment of the present invention.

FIG. 18 shows a flow chart of the steps of a process 1800 for dynamic storage tiering in a cost constrained environment while using I/O temperature to particularly select files for transfer into tier 2 storage and to particularly select files for transfer out of tier 2 storage in accordance with one embodiment of the present invention. As depicted in FIG. 18, process 1800 is substantially similar to process 1700 of FIG. 17, however process 1800 includes steps 1806-1809 which introduce a cost constraint into the tier allocation decision making process.

Process 1800 begins in step 1801, where the DST engine calculates the ratio of per file activity during an interval relative to overall file system activity. As described above, the DST engine accesses the file change log and the dynamic file location map, and based upon the information, identifies files that are qualified for I/O activity-based relocation. Process 1810 then takes two parallel paths.

In step 1802, the DST engine specifically calculates candidates for relocation into tier 1 storage. As described above, files experiencing high random reads are preferred, and are identified by the DST engine (e.g., pseudo code program A). In step 1803, the DST engine calculates candidates for relocation out of tier 1 storage. Generally, as described above, once read accesses I/O temperature falls below the computed threshold a particular file becomes a candidate for relocation out of tier 1 storage (e.g., pseudo code equation B).

In step 1804, the DST engine specifically calculates candidates for relocation into tier 2 storage. As described above, files experiencing high random reads are preferred, and are identified by the DST engine, however, tier 2 storage is typically rotating disc media (e.g., less preference for random-access reads). In step 1805, the DST engine calculates candidates for relocation out of tier 2 storage. Generally, as described above, there is not a strong a preference for read accesses with tier 2 storage. Thus, once read or write access I/O temperature falls below the computed threshold, a particular file becomes a candidate for relocation out of tier 2 storage and into tier 3 storage. As described above, tier 3 storage is typically used for seldom accessed files. Importantly, tier 1 storage has the highest price, tier 2 storage has a moderate price, and tier 3 storage has a comparatively low price.

Subsequently, in step 1806, the DST engine performs transfer balancing to ensure full utilization of tier 2 storage, subject to the earlier described condition of ensuring full utilization of tier 1 storage, and selects files for relocation. In other words, for performance reasons it is to the file system's advantage to put the most time sensitive and critical data in tier 1 storage, while also ensuring full utilization of tier 2 storage before transferring files into the low performance of tier 3 storage.

In step 1807, the DST engine checks to determine whether the allocated storage falls within a budget amount. If the storage costs are within budget, process 1800 proceeds to step 1809 where the DST process continues. If the storage costs are above budgeted amounts, process 1800 proceeds to step 1808 where the parameters that control transfer balancing and relocation candidate selection are adjusted to reduce costs. There may be some circumstances where in order to maintain a budget amount, trade-offs may be made between the very expensive tier 1 storage and the less expensive 2 storage. For example, tier 2 storage may be fast enough for many applications, thereby allowing an administrator to deploy a smaller volume of expensive tier 1 storage. Similarly, there may be many applications that are not sensitive to I/O speed even though they implement a large number of accesses. Such applications could be excellent candidates for deploying to tier 3 storage. In step 1807, the selected files are relocated using the DST engine.

Figure 19:
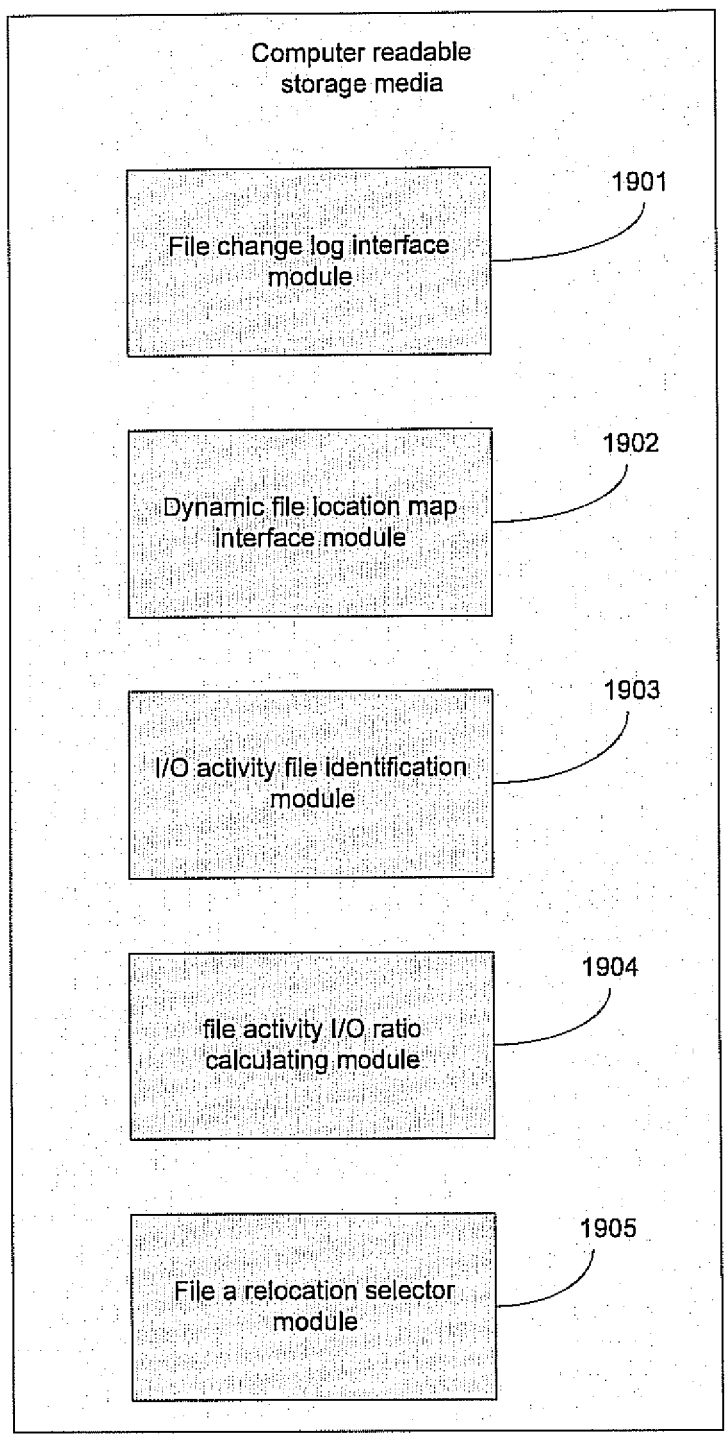
FIG. 19 shows a computer readable storage media storing software-based instantiations of functional modules in accordance with one embodiment of the present invention.

FIG. 19 shows a computer readable storage media storing software-based instantiations of modules 1901-1905 in accordance with one embodiment of the present invention. As depicted in FIG. 19, the modules 1901-1905 function by implementing a process (e.g., process 1500 of FIG. 15) for using I/O temperature to relocate files into and out of a storage tier.

FIG. 19 shows a flow chart of the steps of a process 1900 for using I/O temperature to relocate files into and out of a storage tier in accordance with one embodiment of the present invention. As depicted in FIG. 19, the storage tier comprises SSD based storage devices.

The file change log interface module 1901 functions by providing the DST engine access to the file change log. The dynamic file location map interface module 1902 functions by providing the DST engine access to the dynamic file location map. The I/O activity file identification module functions by interoperating with the DST engine to identify files that are qualified for I/O activity-based relocation.

The file activity I/O ratio calculating module functions by interoperating with the DST engine to calculate the ratio of per file activity during an interval relative to overall file system activity. As described above, the DST engine (1) calculates the ratio of per-file activity during INTERVAL relative to overall file system activity over a longer period (called AveragePeriod as referred to herein), and (2) selects files for relocation based on highest ratio of activity during INTERVAL to file system activity during AveragePeriod. The file relocation selector module functions by selecting files for relocation based on the calculated ratios.

Figure 20:
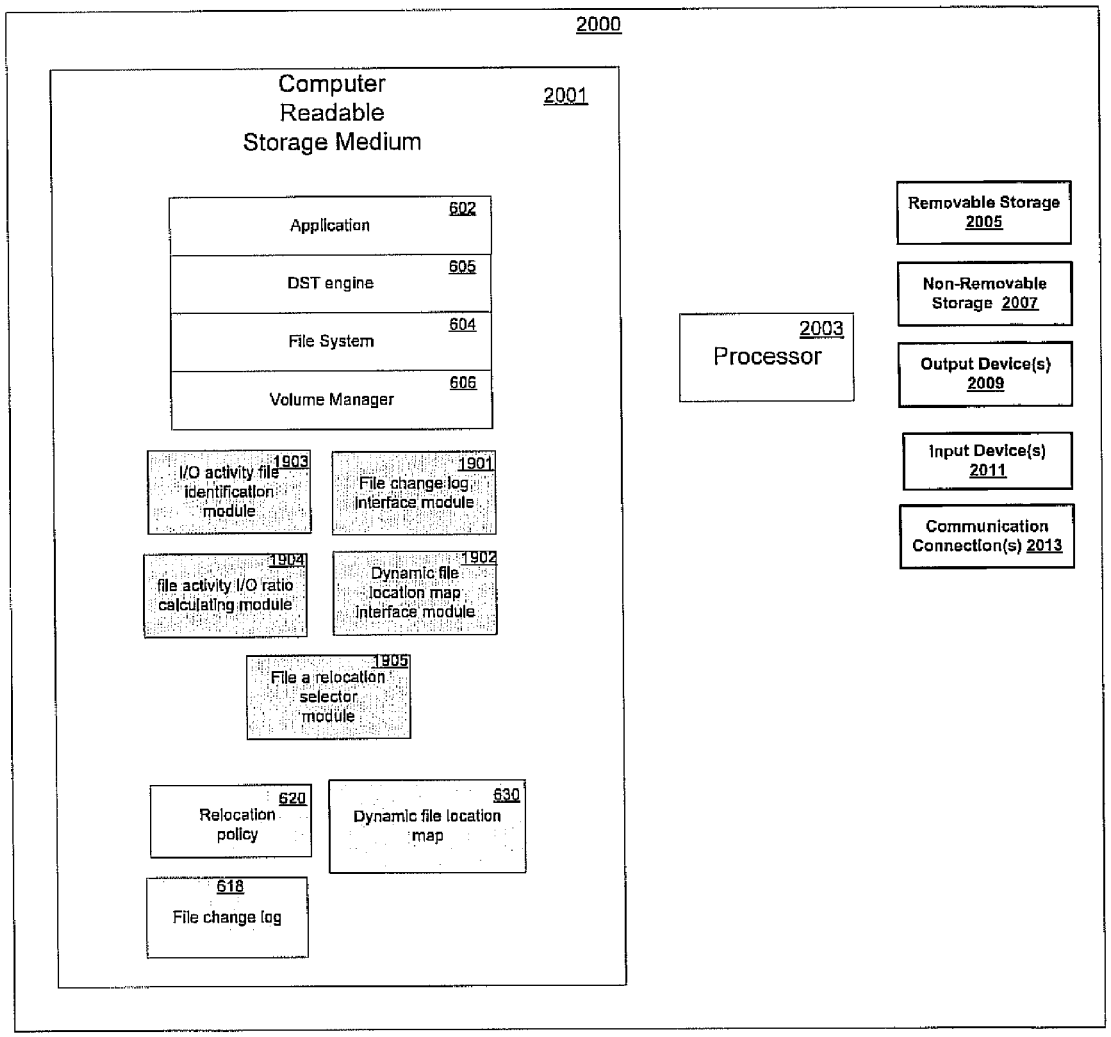
FIG. 20 shows another exemplary computer system according to one embodiment of the present invention.

FIG. 20 shows an exemplary computer system 2000 according to one embodiment. Computer system 2000 depicts the components of a basic computer system providing the execution environment for certain hardware-based and software-based functionality for the above described embodiments. For example, computer system 2000 can be a system upon which the one or more software stacks (e.g., modules 602-630) from FIG. 6 and software modules 1901-1905 from FIG. 19 are instantiated. Computer system 2000 can be implemented as, for example, a server computer system, workstation computer system, desktop computer system, or laptop computer system. Similarly, computer system 2000 can be implemented as a handheld device. Computer system 2000 typically includes at least some form of computer readable media (e.g., computer readable storage medium 2001). Computer readable media can be a number of different types of available media that can be accessed by computer system 2000 and can include, but is not limited to, computer storage media.

In its most basic configuration, computer system 2000 typically includes processing unit 2003 and memory 2001. Depending on the exact configuration and type of computer system 2000 that is used, memory 2001 can be volatile (e.g., such as DRAM, etc.) 2001a, non-volatile 2001b (e.g., such as ROM, flash memory, etc.) or some combination of the two. Similarly, the memory 2001 can comprise other devices besides solid-state devices, such as, for example, magnetic disk-based media, optical media, or the like.

Additionally, computer system 2000 can include other mass storage systems (e.g., removable 2005 and/or non-removable 2007) such as magnetic or optical disks or tape. Similarly, computer system 2000 can include input devices 2009 and/or output devices 2011 (e.g., such as a display). Computer system 2000 can further include network connections 2013 to other devices, computers, networks, servers, etc. using either wired or wireless media. As all of these devices are well known in the art, they need not be discussed in detail.

It should further be noted, that the computer system 2000 can have some, most, or all of its functionality supplanted by a distributed computer system having a large number of dispersed computing nodes, such as would be the case where the functionality of the computer system 2000 is partly or wholly executed using a cloud computing environment.

It should be noted that the term "volume" as used herein may refer to any defined amount of storage on one or more storage devices. In addition to its size and the storage device or device on which it is allocated, a volume may, in some cases, have other attributes (e.g. protection/performance features such as mirroring, striping, RAID level, spanning or concatenation etc.). The term volume may include, for example, logical volume as used in Unix-type operating systems such as Linux, AIX from IBM Corp., Solaris from Sun Microsystems, etc. The term volume may also include, for example, a volume as defined by various volume manager software such as VERITAS Volume Manager™ from VERITAS Software Corporation. The term volume may further include a partition as used, e.g., in the Microsoft Windows™ and/or disk operating system (DOS) operating systems. A partition may be a division of storage on a single disk drive, isolating the partitioned storage from other storage on the disk drive. Partitions may be primary or extended. The term volume may further refer to volume groups.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for identifying data for relocation in a multi-volume file system, comprising:
generating a file location map, the file location map containing a list of the locations of files that occupy space on each of a plurality of volumes of the file system, the file system comprising at least a first volume and a second volume;
updating the file location map in accordance with changes in a file change log for the file system;
identifying, using at least one computer processor, data residing on the first volume of the file system by scanning the file location map; using the identified data, calculating a ratio of per-file activity during a first time period relative to overall file system activity over a second time period to derive a file activity ratio for each of the files of the identified data; and
selecting files for relocation based on the file activity ratio, wherein the file change log is scanned in a sampling interval to identify files active during the sampling interval in response to at least one action.

2. The method of claim 1, wherein the file change log is scanned to identify the files active during the sampling interval in response to a received a user command.

3. The method of claim 1, wherein the file change log is scanned to identify the files active during the sampling interval in response to a predetermined schedule.

4. The method of claim 1, wherein the file change log is scanned to determine which files are active during the sampling interval and wherein the file location map is used to determine which files are located on a volume of interest independent of activity against said which files.

5. The method of claim 1, wherein files of the identified data having a file activity ratio below a low threshold are relocated from the first volume to the second volume, and files of the identified data having a file activity ratio above a high threshold are relocated from the second volume to the first volume, wherein the first volume is of a higher performance tier than the second volume.

6. The method of claim 5, wherein the first volume comprises SSD (solid-state disk) based storage and the second volume comprises rotating disk media based storage.

7. The method of claim 6, wherein files of the identified data having write activity above a high write activity threshold are relocated from the first volume to the second volume.

8. A non-transitory computer readable storage medium having stored thereon computer executable instructions that, if executed by a computer system, cause the computer system to perform a method comprising:
generating a file location map, the file location map containing a list of the locations of files that occupy space on each of a plurality of volumes of the file system, the file system comprising at least a first volume and a second volume, wherein the first volume is of a higher performance tier than the second volume; updating the file location map in accordance with changes in a file change log for the file system;
identifying data residing on the first volume of the file system by scanning the file location map;
using the identified data, calculating a ratio of per-file activity during a first time period relative to overall file system activity over a second time period to derive a file activity ratio for each of the files of the identified data, wherein the file change log is scanned in a sampling interval to identify files active during the sampling interval; and
selecting inactive files for relocation based on the file activity ratio, wherein the file change log is scanned in a sampling interval to identify files active during the sampling interval in response to at least one action.

9. The computer readable storage medium of claim 8, wherein the file location map is used to determine which files are located on a volume of interest independent of activity against said which files.

10. The computer readable storage medium of claim 8, wherein files of the identified data having a file activity ratio below a low threshold are relocated from the first volume to the second volume, and files of the identified data having a file activity ratio above a high threshold are relocated from the second volume to the first volume, wherein the first volume is of a higher performance tier than the second volume.

11. The computer readable storage medium of claim 8, wherein the first volume comprises SSD (solid-state disk) based storage and the second volume comprises rotating disk media based storage.

12. The computer readable storage medium of claim 11, wherein files of the identified data having write activity above a high write activity threshold are relocated from the first volume to the second volume.

13. The computer readable storage medium of claim 11, wherein files of the identified data having random read activity above a high write activity threshold are relocated from the second volume to the first volume.

14. The computer readable storage medium of claim 11, wherein the file change log is scanned to determine which files are active during the sampling interval without scanning file system metadata in substantially its entirety.

15. A multivolume file system, comprising:
a computer system having a processor coupled to a computer readable storage media and executing computer readable code which causes the computer system to:
generate a file location map, the file location map containing a list of the locations of files that occupy space on each of a plurality of volumes of the file system, the file system comprising at least a first volume and a second volume, wherein the first volume is of a higher performance tier than the second volume;
update the file location map in accordance with changes in a file change log for the file system;
identify data residing on the first volume of the file system by scanning the file location map;
using the identified data, calculate a ratio of per-file activity during a first time period relative to overall file system activity over a second time period to derive a file activity ratio for each of the files of the identified data, wherein the file change log is scanned in a sampling interval to identify files active during the sampling interval; and
select files for relocation based on the file activity ratio, wherein the file change log is scanned in a sampling interval to identify files active during the sampling interval in response to at least one action.

16. The multivolume file system of claim 15, wherein the file location map is used to determine which files are located on a volume of interest independent of activity against said which files.

17. The multivolume file system of claim 15, wherein files of the identified data having a file activity ratio below a low threshold are relocated from the first volume to the second volume, and files of the identified data having a file activity ratio above a high threshold are relocated from the second volume to the first volume, wherein the first volume is of a higher performance tier than the second volume.

18. The multivolume file system of claim 15, wherein the first volume comprises SSD (solid-state disk) based storage and the second volume comprises rotating disk media based storage.

19. The multivolume file system of claim 15, wherein files of the identified data having write activity above a high write activity threshold are relocated from the first volume to the second volume and files of the identified data having random read activity above a high write activity threshold are relocated from the second volume to the first volume.

* * * * *